US011457500B2

(12) United States Patent
Jin et al.

(10) Patent No.: US 11,457,500 B2
(45) Date of Patent: Sep. 27, 2022

(54) WIRELESS COMMUNICATION METHOD AND DEVICE

(71) Applicant: HUAWEI TECHNOLOGIES CO., LTD., Guangdong (CN)

(72) Inventors: Hui Jin, Beijing (CN); Xiaoyan Duan, Beijing (CN); Guowei Ouyang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 401 days.

(21) Appl. No.: 16/305,171

(22) PCT Filed: Aug. 22, 2016

(86) PCT No.: PCT/CN2016/096295
§ 371 (c)(1),
(2) Date: Nov. 28, 2018

(87) PCT Pub. No.: WO2017/206373
PCT Pub. Date: Dec. 7, 2017

(65) Prior Publication Data
US 2021/0204349 A1    Jul. 1, 2021

(30) Foreign Application Priority Data

May 30, 2016 (WO) ................ PCT/CN2016/083887

(51) Int. Cl.
*H04W 76/25* (2018.01)
*H04W 76/11* (2018.01)
(Continued)

(52) U.S. Cl.
CPC .......... *H04W 76/25* (2018.02); *H04W 48/16* (2013.01); *H04W 48/18* (2013.01); *H04W 76/11* (2018.02); *H04W 76/27* (2018.02)

(58) Field of Classification Search
CPC ..... H04W 76/25; H04W 76/11; H04W 76/27; H04W 48/16; H04W 48/18;
(Continued)

(56) References Cited

U.S. PATENT DOCUMENTS

| 2014/0086177 A1 | 3/2014 | Adjakple et al. |
| 2014/0099940 A1 | 4/2014 | Kim et al. |

(Continued)

FOREIGN PATENT DOCUMENTS

| CN | 103379592 A | 10/2013 |
| CN | 103650437 A | 3/2014 |

(Continued)

OTHER PUBLICATIONS

S2-161785, NEC, "Solution: shared and dedicated network functions for network slicing", SA WG2 Meeting #114,Apr. 11-15, 2016, Sophia Antipolis, 3 pages.

(Continued)

*Primary Examiner* — Diane D Mizrahi
(74) *Attorney, Agent, or Firm* — Conley Rose, P.C.

(57) ABSTRACT

Embodiments of the present application provide user equipment (UE), a first core network entity, and a second core network entity, the first core network entity executes steps that include: establishing a signaling connection to the UE; receiving network slice information and a non-access stratum NAS message that are sent by the UE over the signaling connection; determining a target network slice from the at least one network slice based on the network slice information, wherein the target network slice comprises a second core network entity, and the UE performs NAS communication with the second core network entity by using the RAN and the first core network entity; and sending the NAS message to the second core network entity.

24 Claims, 19 Drawing Sheets

(51) Int. Cl.
*H04W 76/27* (2018.01)
*H04W 48/16* (2009.01)
*H04W 48/18* (2009.01)

(58) Field of Classification Search
CPC ... H04W 28/0268; H04W 28/12; H04W 8/08; H04W 8/26; H04W 60/00; B01D 17/047; B01D 17/0217; B01D 17/00; C02F 1/385; C02F 1/40; C02F 2101/301; C02F 1/26; C07C 303/44; C12Q 1/6806; H04L 47/2466

See application file for complete search history.

(56) References Cited

U.S. PATENT DOCUMENTS

| | | | |
|---|---|---|---|
| 2014/0133456 A1 | 5/2014 | Donepudi et al. | |
| 2014/0372624 A1 | 12/2014 | Wang et al. | |
| 2015/0066875 A1 | 3/2015 | Peake et al. | |
| 2015/0327327 A1 | 11/2015 | Jain et al. | |
| 2018/0279186 A1* | 9/2018 | Park | H04W 36/30 |
| 2020/0305054 A1* | 9/2020 | Zee | H04W 36/0058 |

FOREIGN PATENT DOCUMENTS

| | | |
|---|---|---|
| CN | 104618891 A | 5/2015 |
| JP | 2017515416 A | 6/2017 |
| JP | 2019520748 A | 7/2019 |
| WO | 2015084767 A1 | 6/2015 |
| WO | 2015171242 A1 | 11/2015 |

OTHER PUBLICATIONS

S2-162147, China Mobile, et al., "Network Slicing Architecture and High-Level Function Definition", 3GPP SA WG2 TD SA WG2 Meeting #114, Apr. 11-15, 2016, Sophia Antipolis, France, 3 pages.

Nokia, et al., "Slice Selection solution update," S2-162982, SA WG2 Meeting #115, May 23-27, 2016, Nanjing, P.R. China, 13 pages.

Motorola Mobility, et al.,"Solution: Simultaneous Access to Multiple Independent Network Slices," XP051109080, S2-162314, SA WG2 Meeting #115, May 23-27, 2016, 6 pages.

Nokia, et al., "Slice Selection solution update," XP051116569, S2-163111, SA WG2 Meeting #115, May 23-27, 2016, 12 pages.

Foreign Communication From A Counterpart Application, European Application No. 16903755, Supplementary European Search Report dated Mar. 19, 2019, 9 pages.

Etri, et al., "NextGen Core Architecture solution for Network Slice Instance Selection," S2-162551, SA WG2 Meeting #115, May 23-27, 2016, Nanjing, China, 5 pages.

Deutsche Telekom AG, et al., "Proposal to update key issue 16 on 3GPP system aspects to integrate private networks," S2-163112, SA WG2 Meeting #115, May 23-27, 2016, Nanjing, P.R. China, 5 pages.

LG Electronics Inc., "Network Slice Selection considering Authentication and Authorization," S2-163395, SA WG2 Meeting #116, Jul. 11-15, 2016, Vienna, Austria, 6 pages.

Catt, "NG3 interface related procedures," S2-165383, SA WG2 Meeting #116BIS, Aug. 29-Sep. 2, 2016, Sanya, P.R China, 5 pages.

Foreign Communication From A Counterpart Application, Japanese Application No. 2018-562520, Japanese Office Action dated Dec. 3, 2019, 10 pages.

Foreign Communication From A Counterpart Application, Japanese Application No. 2018-562520, English Translation of Japanese Office Action dated Dec. 3, 2019, 10 pages.

3GPP TR 22.864 V1.0.0 (Feb. 2016), 3rd Generation Partnership Project;Technical Specification Group Services and System Aspects;Feasibility Study on New Services and Markets Technology Enablers—Network Operation;Stage 1 (Release 14), Febuary 2016. total 24 pages.

Huawei, HiSilicon:"UE Slice Association/Overload control Procedure", 3GPP TSG SA WG2 Meeting #115 S2-163161, May 23-27, 2016, Nanjing, China. Total 9 pages.

Zte:"Network Slice Selection Procedure", 3GPP TSG RAN WG3 Meeting #92 R3-161107, Nanjing, China, May 23-27, 2016. total 4 pages.

TSG SA WG1:"TR 22.864: Study on New Services and Markets Technology Enablers—Network Operation", 3GPP TSG SA Meeting #71 SP-160122, Goteborg, Sweden Mar. 9-11, 2016. total 1 page.

Anand R. Prasad et al, "Overview of SAE/LTE security," IEEK Transactions on Smart Processing and Computing, vol. 2, No. 1, Feb. 2013, IEEK Transactions on Smart Processing and Computing, 8 pages.

* cited by examiner

WIRELESS COMMUNICATION METHOD AND DEVICE

CROSS-REFERENCE TO RELATED APPLICATIONS

This application is a National Stage of International Application No. PCT/CN2016/096295, filed on Aug. 22, 2016, which claims priority to International Patent Application No. PCT/CN2016/083887, filed on May 30, 2016. Both of the aforementioned applications are hereby incorporated by reference in their entireties.

TECHNICAL FIELD

Embodiments of the present invention relate to the communications field, and more specifically, to a wireless communication method and a device.

BACKGROUND

To meet service requirements of various scenarios in a mobile communications system, a physical network is divided into a plurality of virtual logical networks. These virtual logical networks are called network slices (Network Slicing). To be specific, a network may include a plurality of network slices, and a specific network slice may be defined as a set of logical network functional entities that support a communication service requirement of a specific scenario, for example, a network slice supporting communication involving a large quantity of machine devices, a network slice supporting a mobile broadband service, and a network slice supporting a low delay and high reliability.

An existing standard solution of the 3rd Generation Partnership Project (3rd Generation Partnership Project, "3GPP" for short) supports a scenario in which UE simultaneously accesses a plurality of network slices. In a communication process in which UE simultaneously accesses a plurality of network slices, there is a large amount of signaling in a network. This causes waste of network resources and affects user's communication experience.

SUMMARY

This application provides a wireless communication method and a device, so as to reduce an amount of signaling in a communication process, improve network resource utilization, and improve network management and maintenance efficiency.

For ease of understanding this application, some elements to be introduced to descriptions of this application are first described herein.

A network slice (Network Slicing), which is also referred to as a network fragment, is a set of logical network functional entities that support a communication service requirement of a specific scenario.

An idle (Idle) mode is a mode in which the UE has neither a control plane connection nor a user plane connection to a core network entity in a network slice.

A connected (Connected) mode is a mode in which the UE has at least a non-access stratum (Non-Access Stratum, "NAS" for short) control plane connection to a core network entity in a network slice.

NAS communication is signaling transmission between UE and a core network entity.

According to a first aspect, a wireless communication method is provided. The method is applied to a communications system. The communications system includes user equipment UE, a radio access network (Radio Access Network, "RAN" for short), a first core network entity, and at least one network slice. The method includes: establishing, by the first core network entity, a signaling connection to the UE; receiving, by the first core network entity, network slice information and a non-access stratum NAS message that are sent by the UE over the signaling connection; determining, by the first core network entity, a target network slice from the at least one network slice based on the network slice information, where the target network slice includes a second core network entity, and the UE performs NAS communication with the second core network entity by using the RAN and the first core network entity; and sending, by the first core network entity, the NAS message to the second core network entity.

Therefore, according to the wireless communication method in this application, NAS messages of the UE can be forwarded to core network entities in a plurality of network slices by using one core network entity, and the UE does not need to establish a signaling connection to a core network entity in each network slice to transmit the NAS message, so that an amount of signaling in a communication process can be reduced, and network management and maintenance efficiency can be improved.

Optionally, when the first core network entity establishes the signaling connection to the UE, the first core network entity receives a connection establishment request message sent by the UE, where the connection establishment request message is used to request to establish a signaling connection to the first core network entity; the first core network entity obtains authentication information of the UE; and when the first core network entity determines, based on the authentication information, that the UE can be authenticated, the first core network entity sends a connection establishment response message to the UE, so as to establish the signaling connection between the UE and the first core network entity.

Optionally, the first core network entity sends a query request message to a home subscriber server (Home Subscriber Server, "HSS" for short), where the query request message is used to request to query the authentication information of the UE, and the first core network entity receives the authentication information of the UE that is sent by the HSS based on the query request message; or when the first core network entity determines that the authentication information of the UE does not exist in the first core network entity, the first core network entity sends a query request message to the second core network entity, where the query request message is used to request to query the authentication information of the UE, and the first core network entity receives the authentication information of the UE that is sent by the second core network entity.

With reference to the first aspect, in a first possible implementation of the first aspect, the network slice information is a network slice identifier or a data transmission requirement that a network slice needs to support.

the determining, by the first core network entity, a target network slice from the at least one network slice based on the network slice information includes: determining, by the first core network entity, a network slice corresponding to the network slice identifier as the target network slice; or determining, by the first core network entity, the network slice supporting the data transmission requirement as the target network slice.

If the first core network entity determines that there are a plurality of network slices supporting the data transmission requirement, the first core network entity may determine a network slice with lowest load as the target network slice, or determine a network slice with a highest priority as the target network slice.

With reference to the first aspect or the first possible implementation of the first aspect, in a second possible implementation of the first aspect, the NAS message is an attach request message.

The sending, by the first core network entity, the NAS message to the second core network entity includes: sending, by the first core network entity, the attach request message and identification information of the first core network entity to the second core network entity, so that after registering the UE with the target network slice based on the attach request message, the second core network entity sends the NAS message to the UE based on the identification information of the first core network entity.

With reference to the second possible implementation of the first aspect, in a third possible implementation of the first aspect, the target network slice further includes a third core network entity, and the UE performs data communication with the third core network entity by using the RAN.

After the sending, by the first core network entity, the attach request message and identification information of the first core network entity to the second core network entity, the method further includes: receiving, by the first core network entity, user plane information sent by the second core network entity, where the user plane information is used by the RAN to establish a user plane connection to the third core network entity; and sending, by the first core network entity, the user plane information to the RAN, so that the RAN establishes the user plane connection to the third core network entity based on the user plane information.

Optionally, the user plane information includes information about the third core network entity. The information about the third core entity is an Internet Protocol (Internet Protocol, "IP" for short) address of the third core network entity.

With reference to the third possible implementation of the first aspect, in a fourth possible implementation of the first aspect, the method further includes: sending, by the first core network entity, the network slice information to the RAN, so that the RAN stores a correspondence between a data radio bearer DRB between the RAN and the UE plus the network slice information, and the user plane connection between the RAN and the third core network entity.

After receiving a data request at an application layer, the UE determines quality of service (Quality of Service, "QoS" for short) and network slice information that are corresponding to data, and sends the data to a data radio bearer that is between the UE and the RAN and that is corresponding to the QoS. The data carries the network slice information. The RAN determines, based on a previously stored correspondence between a DRB between the UE and the RAN plus network slice information, and a user plane connection between the RAN and the third core network entity, a user plane connection that is between the RAN and the third core network entity and that needs to be used, and sends the data to the user plane connection. Therefore, data with same QoS can be mapped to a same DRB, and a DRB between the UE and the RAN can be reused in a plurality of network slices, so as to reduce a quantity of DRBs in a network and save network resources.

With reference to any one of the first aspect and the foregoing possible implementations, in a fifth possible implementation of the first aspect, the method further includes: receiving, by the first core network entity, a first location update request message sent by the UE, where the first location update request message carries a temporary identity of the UE, the first location update request message is used to notify the first core network entity of a location area in which the UE is currently located, and the temporary identity is allocated, to the UE, by a core network entity that serves the UE before the UE sends the first location update request message to the first core network entity; determining, by the first core network entity based on the temporary identity, a fourth core network entity in a network slice with which the UE currently registers; and sending, by the first core network entity, the identification information of the first core network entity to the fourth core network entity, so that the fourth core network entity sends the NAS message to the UE based on the identification information of the first core network entity.

The determining, by the first core network entity based on the temporary identity, a fourth core network entity in a network slice with which the UE currently registers may be specifically: determining, by the first core network entity based on the temporary identity, the core network entity that serves the UE before the UE sends the first message to the first core network entity; sending a request message to the core network entity that serves the UE, where the request message is used to request, from the core network entity that serves the UE, information about the fourth core network entity in the network slice with which the UE currently registers; receiving, by the first core network entity, a response message sent by the core network entity that serves the UE, where the response message includes the information about the fourth core network entity in the network slice with which the UE currently registers; and determining, by the first core network entity based on the response message, the fourth core network entity in the network slice with which the UE currently registers.

Optionally, the first core network entity initiates an update to the HSS, and the HSS sends acknowledgement information to the first core network entity. The acknowledgement information is used to notify the first core network entity that the HS S has restored address information of the first core network entity, so that another core network entity in a network slice finds the first core network entity by using the HSS.

Therefore, when a location of the UE is being updated, the location needs to be updated to only the first core network entity, and the first core network entity notifies the UE of a core network entity in a network slice with which the UE has registered, so that an amount of signaling in a network can be reduced.

According to a second aspect, a wireless communication method is provided. The method is applied to a communications system. The communications system includes user equipment UE, a radio access network RAN, a first core network entity, and at least one network slice. A target network slice in the at least one network slice includes a second core network entity. The UE performs non-access stratum NAS communication with the second core network entity by using the RAN and the first core network entity. The method includes: receiving, by the second core network entity, a NAS message sent by the first core network entity, where the target network slice is determined by the first core network entity based on network slice information sent by the UE, and the NAS message is sent by the UE to the first core network entity; and performing, by the second core network entity, NAS communication with the UE based on the NAS message.

Therefore, according to the wireless communication method in this application, a core network entity in a network slice can receive the NAS message of the UE that is forwarded by a core network entity outside the network slice, and the UE does not need to establish a signaling connection to a core network entity in each network slice to transmit the NAS message, so that an amount of signaling in a communication process can be reduced, and network management and maintenance efficiency can be improved.

With reference to the second aspect, in a first possible implementation of the second aspect, the NAS message is an attach request message.

The receiving, by the second core network entity, a NAS message sent by the first core network entity includes: receiving, by the second core network entity, the attach request message and identification information of the first core network entity that are sent by the first core network entity.

The performing, by the second core network entity, NAS communication with the UE based on the NAS message includes: registering, by the second core network entity, the UE with the target network slice based on the attach request message; and sending, by the second core network entity, a NAS message to the UE based on the identification information of the first core network entity.

With reference to the first possible implementation of the second aspect, in a second possible implementation of the second aspect, the target network slice further includes a third core network entity, and the UE performs data communication with the third core network entity by using the RAN.

After the receiving, by the second core network entity, the attach request message and identification information of the first core network entity that are sent by the first core network entity, the method further includes: sending, by the second core network entity, user plane information to the first core network entity, where the user plane information is used by the RAN to establish a user plane connection to the third core network entity, so that the first core network entity sends the user plane information to the RAN, and the RAN establishes the user plane connection to the third core network entity based on the user plane information.

Optionally, the second core network entity sends indication information to the UE, and the indication information is used to notify the UE that the attach request of the UE has been accepted.

According to a third aspect, a wireless communication method is provided. The method is applied to a communications system. The communications system includes user equipment UE, a radio access network RAN, a first core network entity, and at least one network slice. The method includes: establishing, by the UE, a signaling connection to the first core network entity; and sending, by the UE, network slice information and a non-access stratum NAS message to the first core network entity, so that the first core network entity determines a target network slice from the at least one network slice based on the network slice information, and sends the NAS message to a second core network entity in the target network slice, where the UE performs NAS communication with the second core network entity by using the RAN and the first core network entity.

Therefore, according to the wireless communication method in this application, the user equipment sends the network slice information and the NAS message to the core network entity that has established a connection to the UE, so that the core network entity determines, based on the network slice information sent by the user equipment, the target network slice that serves the UE, and sends the NAS message to the core network entity in the target network slice. In this way, one core network entity can forward NAS messages of the UE to core network entities of a plurality of network slices, and the UE does not need to establish a signaling connection to a core network entity in each network slice to transmit the NAS message, so that an amount of signaling in a communication process can be reduced, and network management and maintenance efficiency can be improved.

With reference to the third aspect or the first possible implementation of the third aspect, in a second possible implementation of the third aspect, the network slice information is a network slice identifier or a data transmission requirement that a network slice needs to support.

With reference to the third aspect or the first possible implementation of the third aspect, in a second possible implementation of the third aspect, the NAS message is an attach request message.

Optionally, the UE receives indication information sent by the second core network entity, and the indication information is used to indicate that the attach request of the UE has been accepted.

According to a fourth aspect, a wireless communication method is provided. The method is applied to a communications system. The communications system includes user equipment UE, a radio access network RAN, a first core network entity, and at least one network slice. The method includes: determining, by the first core network entity, that the UE needs to change from an idle mode to a connected mode in a target network slice in the at least one network slice, where the target network slice includes a second core network entity, and the UE performs non-access stratum NAS communication with the second core network entity by using the RAN and the first core network entity; and sending, by the first core network entity, a first message to the second core network entity, where the first message is used to request to change a mode of the UE from the idle mode to the connected mode, so that the second core network entity establishes a NAS connection to the UE based on the first message, to enable the UE to enter the connected mode.

Therefore, according to the wireless communication method in this application, when determining that the UE needs to change from the idle mode to the connected mode in the target network slice, the first core network entity sends a message for requesting to change the mode of the UE to the connected mode to the second core network entity in the target network slice, so that the second core network entity can establish the control plane connection to the UE based on the message sent by the core network entity, to enable the UE to enter the connected mode. In this way, it can be avoided that connection modes are difficult to manage because UE is in an idle mode in a network slice and is in a connected mode in another network slice, and network management efficiency can be improved.

With reference to the fourth aspect, in a first possible implementation of the fourth aspect, the target network slice further includes a third core network entity, and the UE performs data communication with the third core network entity by using the RAN.

After the sending, by the first core network entity, a first message to the second core network entity, the method further includes: receiving, by the first core network entity, user plane information sent by the second core network entity, where the user plane information is used by the RAN to establish a user plane connection to the third core network entity; and sending, by the first core network entity, the user plane information to the RAN, so that the RAN establishes the user plane connection to the third core network entity based on the user plane information.

With reference to the fourth aspect or the first possible implementation of the fourth aspect, in a second possible implementation of the fourth aspect, the determining, by the first core network entity, that the UE needs to change from an idle mode to a connected mode in a target network slice in the at least one network slice includes: receiving, by the first core network entity, a second message sent by the UE, where the second message includes network slice information, and the second message is used by the UE to request to enter the connected mode in a network slice indicated by the network slice information; and determining, by the first core network entity based on the second message, that the UE needs to change from the idle mode to the connected mode in the network slice indicated by the network slice information.

Optionally, the first core network entity sends the network slice information to the RAN, so that the RAN stores a correspondence between a data radio bearer DRB between the RAN and the UE plus the network slice information, and the user plane connection between the RAN and the third core network entity. Therefore, the DRB between the UE and the RAN can be reused in a plurality of network slices, so that a quantity of DRBs in a network is reduced, and network resources are saved.

With reference to the fourth aspect or the first possible implementation of the fourth aspect, in a third possible implementation of the fourth aspect, the determining, by the first core network entity, that the UE needs to change from an idle mode to a connected mode in a target network slice in the at least one network slice includes: receiving, by the first core network entity, a third message sent by the second core network entity, where the third message is used to indicate that the second core network entity has data to be sent to the UE, or the third message is used to indicate that the second core network entity needs to perform NAS communication with the UE; and determining, by the first core network entity based on the third message, that the UE needs to change from the idle mode to the connected mode in the target network slice.

The sending, by the first core network entity, a first message to the second core network entity includes: sending, by the first core network device, the first message to the second core network entity if the first core network device determines that a signaling connection to the UE is established.

With reference to the third possible implementation of the fourth aspect, in a fourth possible implementation of the fourth aspect, the sending, by the first core network entity, a first message to the second core network entity includes: sending, by the first core network entity, a paging message to the UE if the first core network entity determines that no signaling connection is established between the first core network entity and the UE; receiving, by the first core network entity, a fourth message sent by the UE based on the paging message, where the fourth message is used to request to establish a signaling connection to the first core network entity; establishing, by the first core network entity, a signaling connection to the UE based on the fourth message; and sending, by the first core network entity, the first message to the second core network entity after the first core network entity establishes the signaling connection to the UE.

With reference to the first possible implementation of the fourth aspect, in a fifth possible implementation of the fourth aspect, the method further includes: receiving, by the first core network entity, a fifth message sent by the second core network entity, where the fifth message is used to instruct the first core network entity to send a sixth message to the RAN, and the sixth message is used to instruct the RAN to release the user plane connection between the RAN and the third core network entity.

Generally, when receiving the fifth message sent by the second core network entity, the first core network entity deletes locally stored context information of the UE.

With reference to the fifth possible implementation of the fourth aspect, in a sixth possible implementation of the fourth aspect, after the first core network entity receives the fifth message sent by the second core network entity, if the first core network entity determines that the UE is in the connected mode in only the target network slice, the sixth message includes connection release information used to instruct the RAN to release a control plane connection and a user plane connection between the RAN and the UE.

With reference to any one of the fourth aspect and the first to the fourth possible implementations of the fourth aspect, in a seventh possible implementation of the fourth aspect, the method further includes: sending, by the first core network entity, a seventh message to the UE, where the seventh message is used to notify that the UE has entered the connected mode in the target network slice.

According to a fifth aspect, a wireless communication method is provided. The method is applied to a communications system. The communications system includes user equipment UE, a radio access network RAN, a first core network entity, and at least one network slice. A target network slice in the at least one network slice includes a second core network entity. The UE performs non-access stratum NAS communication with the second core network entity by using the RAN and the first core network entity. The method includes: sending, by the second core network entity, a first message to the first core network entity, where the first message is used to indicate that the second core network entity has data to be sent to the UE, or the first message is used to indicate that the second core network entity needs to perform NAS communication with the UE, so that the first core network entity determines, based on the first message, that the UE needs to change from an idle mode to a connected mode in the target network slice; receiving, by the second core network entity, a second message sent by the first core network entity, where the second message is used to request to change a mode of the UE from the idle mode to the connected mode; and establishing, by the second core network entity, a NAS connection to the UE based on the second message, to enable the UE to enter the connected mode.

Therefore, according to the wireless communication method in this application, the second core network entity in the target network slice receives the message that is for requesting to change the mode of the user equipment UE to the connected mode and that is sent by the first core network entity outside the target network slice, and establishes a control plane connection to the UE based on the message, to enable the UE to enter the connected mode. In this way, it can be avoided that connection modes are difficult to manage because UE is in an idle mode in a network slice and is in a connected mode in another network slice, and network management efficiency can be improved.

With reference to the fifth aspect, in a first possible implementation of the fifth aspect, the target network slice further includes a third core network entity, and the UE performs data communication with the third core network entity by using the RAN.

After the receiving, by the second core network entity, a second message sent by the first core network entity, the method further includes: sending, by the second core network entity, user plane information to the first core network entity, where the user plane information is used by the RAN to establish a user plane connection to the third core network entity, so that the first core network entity sends the user plane information to the RAN, and the RAN establishes the user plane connection to the third core network entity based on the user plane information.

With reference to the first possible implementation of the fifth aspect, in a second possible implementation of the fifth aspect, the method further includes: sending, by the second core network entity, a third message to the first core network entity, where the third message is used to instruct the first core network entity to send a fourth message to the RAN, and the fourth message is used to instruct the RAN to release the user plane connection between the RAN and the third core network entity.

With reference to the second possible implementation of the fifth aspect, in a third possible implementation of the fifth aspect, before the sending, by the second core network entity, a third message to the first core network entity, the method further includes: receiving, by the second core network entity, a fifth message sent by the third core network entity, where the fifth message is used to indicate that the UE receives or sends no data within preset duration; or receiving, by the second core network entity, a sixth message sent by the UE, where the sixth message is used to request to enter the idle mode in the target network slice.

According to a sixth aspect, a wireless communication method is provided. The method is applied to a communications system. The communications system includes user equipment UE, a radio access network RAN, a first core network entity, and at least one network slice. The method includes: establishing, by the UE, a signaling connection to the first core network entity; and sending, by the UE, a first message to the first core network entity, where the first message is used to request to enter a connected mode in a target network slice, the target network slice includes a second core network entity, and the UE performs non-access stratum NAS communication with the second core network entity by using the RAN and the first core network entity, so that the first core network entity sends, to the second core network entity based on the first message, a second message used to request to change a mode of the UE from an idle mode to the connected mode, so that the second core network entity establishes a NAS connection to the UE based on the second message, to enable the UE to enter the connected mode.

Therefore, according to the wireless communication method in this application, the user equipment sends the message for requesting to enter the connected mode in the target network slice to the core network entity that has established a connection to the user equipment, so that the core network entity interacts with the core network entity in the target network slice based on the message, to change the mode of the user equipment to the connected mode. In this way, it can be avoided that connection modes are difficult to manage because UE is in an idle mode in a network slice and is in a connected mode in another network slice, and network management efficiency can be improved.

With reference to the sixth aspect, in a first possible implementation of the sixth aspect, the method further includes: receiving, by the UE, a third message sent by the first core network entity, where the third message is used to notify that the UE has entered the connected mode in the target network slice.

According to a seventh aspect, a core network entity is provided, and is configured to execute the method in any one of the foregoing first aspect and the possible implementations of the first aspect. Specifically, the core network entity includes a unit configured to execute the method in any one of the foregoing first aspect and the possible implementations of the first aspect.

According to an eighth aspect, a core network entity is provided, and is configured to execute the method in any one of the foregoing second aspect and the possible implementations of the second aspect. Specifically, the core network entity includes a unit configured to execute the method in any one of the foregoing second aspect and the possible implementations of the second aspect.

According to a ninth aspect, user equipment is provided, and is configured to execute the method in any one of the foregoing third aspect and the possible implementations of the third aspect. Specifically, the user equipment includes a unit configured to execute the method in any one of the foregoing third aspect and the possible implementations of the third aspect.

According to a tenth aspect, a core network entity is provided, and is configured to execute the method in any one of the foregoing fourth aspect and the possible implementations of the fourth aspect. Specifically, the core network entity includes a unit configured to execute the method in any one of the foregoing fourth aspect and the possible implementations of the fourth aspect.

According to an eleventh aspect, a core network entity is provided, and is configured to execute the method in any one of the foregoing fifth aspect and the possible implementations of the fifth aspect. Specifically, the core network entity includes a unit configured to execute the method in any one of the foregoing fifth aspect and the possible implementations of the fifth aspect.

According to a twelfth aspect, user equipment is provided, and is configured to execute the method in the foregoing sixth aspect. Specifically, the user equipment includes a unit configured to execute the method in any one of the foregoing sixth aspect and the possible implementation of the sixth aspect.

According to a thirteenth aspect, a core network entity is provided, including a processor, a memory, and a transceiver. The processor, the memory, and the transceiver are connected by using a bus system. The memory is configured to store an instruction. The processor is configured to execute the instruction stored in the memory, so as to control the transceiver to receive information and send information, so that the core network entity executes the method in any one of the foregoing first aspect and the possible implementations of the first aspect.

According to a fourteenth aspect, a core network entity is provided, including a processor, a memory, and a transceiver. The processor, the memory, and the transceiver are connected by using a bus system. The memory is configured to store an instruction. The processor is configured to execute the instruction stored in the memory, so as to control the transceiver to receive information and send information, so that the core network entity executes the method in any one of the foregoing second aspect and the possible implementations of the second aspect.

According to a fifteenth aspect, user equipment is provided, including a processor, a memory, and a transceiver.

The processor, the memory, and the transceiver are connected by using a bus system. The memory is configured to store an instruction. The processor is configured to execute the instruction stored in the memory, so as to control the transceiver to receive information and send information, so that the user equipment executes the method in any one of the foregoing third aspect and the possible implementations of the third aspect.

According to a sixteenth aspect, a core network entity is provided, including a processor, a memory, and a transceiver. The processor, the memory, and the transceiver are connected by using a bus system. The memory is configured to store an instruction. The processor is configured to execute the instruction stored in the memory, so as to control the transceiver to receive information and send information, so that the core network entity executes the method in any one of the foregoing fourth aspect and the possible implementations of the fourth aspect.

According to a seventeenth aspect, a core network entity is provided, including a processor, a memory, and a transceiver. The processor, the memory, and the transceiver are connected by using a bus system. The memory is configured to store an instruction. The processor is configured to execute the instruction stored in the memory, so as to control the transceiver to receive information and send information, so that the core network entity executes the method in any one of the foregoing fifth aspect and the possible implementations of the fifth aspect.

According to an eighteenth aspect, user equipment is provided, including a processor, a memory, and a transceiver. The processor, the memory, and the transceiver are connected by using a bus system. The memory is configured to store an instruction. The processor is configured to execute the instruction stored in the memory, so as to control the transceiver to receive information and send information, so that the user equipment executes the method in any one of the foregoing sixth aspect and the possible implementation of the sixth aspect.

According to a nineteenth aspect, a computer readable medium is provided, and is configured to store a computer program. The computer program includes an instruction used to execute the method in any one of the first aspect and the possible implementations of the first aspect.

According to a twentieth aspect, a computer readable medium is provided, and is configured to store a computer program. The computer program includes an instruction used to execute the method in any one of the second aspect and the possible implementations of the second aspect.

According to a twenty-first aspect, a computer readable medium is provided, and is configured to store a computer program. The computer program includes an instruction used to execute the method in any one of the third aspect and the possible implementations of the third aspect.

According to a twenty-second aspect, a computer readable medium is provided, and is configured to store a computer program. The computer program includes an instruction used to execute the method in any one of the fourth aspect and the possible implementations of the fourth aspect.

According to a twenty-third aspect, a computer readable medium is provided, and is configured to store a computer program. The computer program includes an instruction used to execute the method in any one of the fifth aspect and the possible implementations of the fifth aspect.

According to a twenty-fourth aspect, a computer readable medium is provided, and is configured to store a computer program. The computer program includes an instruction used to execute the method in any one of the sixth aspect and the possible implementation of the sixth aspect.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
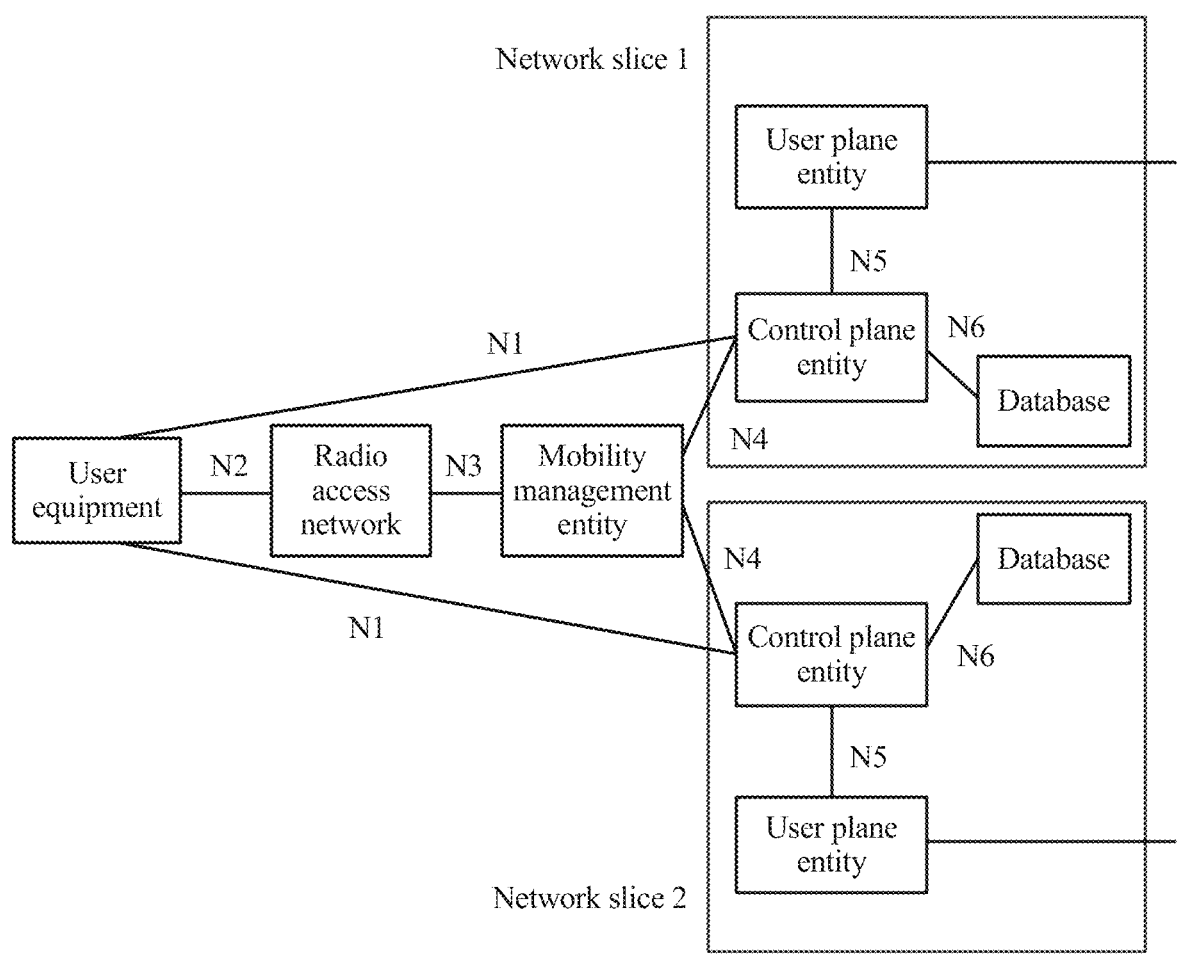
FIG. 1 is a schematic diagram of an architecture of a communications system according to an embodiment of the present invention.

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions of the embodiments of the present invention may be applied to various communications systems, such as: a Global System for Mobile Communications (Global System of Mobile Communication, "GSM" for short) system, a Code Division Multiple Access (Code Division Multiple Access, "CDMA" for short) system, a Wideband Code Division Multiple Access (Wideband Code Division Multiple Access, "WCDMA" for short) system, a Long Term Evolution (Long Term Evolution, "LTE" for short) system, an LTE frequency division duplex (Frequency Division Duplex, "FDD" for short) system, an LTE time division duplex (Time Division Duplex, "TDD" for short), a Universal Mobile Telecommunications System (Universal Mobile Telecommunication System, "UMTS" for short), and a future 5G communications system.

In the embodiments of the present invention, user equipment (User Equipment, "UE" for short) may also be referred to as a terminal device, a mobile station (Mobile Station, "MS" for short), a mobile terminal (Mobile Terminal), and the like. The user equipment may communicate with one or more core networks by using a radio access network (Radio Access Network, "RAN" for short). For example, the user equipment may be a mobile phone (or referred to as a "cellular" phone) or a computer with a mobile terminal. For example, the user equipment may be a portable, pocket-sized, handheld, computer built-in, or in-vehicle mobile apparatus, a terminal device in a future 5G system or a terminal device in a future evolved PLMN network, or a communications chip in the foregoing terminal device.

An existing standard solution of the 3rd Generation Partnership Project (3rd Generation Partnership Project, "3GPP" for short) supports a scenario in which UE simultaneously accesses a plurality of network slices (Network Slicing). In a communication process in which UE simultaneously accesses a plurality of network slices, the UE needs to establish a signaling connection to a core network entity in each network slice to transmit a non-access stratum (Non-Access Stratum, "NAS" for short) message, and consequently there is a large amount of signaling in a network. In addition, the UE may be in an idle (Idle) mode in a network slice and in a connected (Connected) mode in another network slice, and consequently it is difficult to manage connection modes on a radio access network (Radio Access Network, "RAN" for short) side.

In view of this, a wireless communication method may be provided, so as to reduce an amount of signaling generated in a scenario in which UE simultaneously accesses a plurality of network slices, avoid a problem that connection modes are difficult to manage because UE is in an idle mode in a network slice and is in a connected mode in another network slice, and improve network management efficiency.

FIG. 1 shows a schematic diagram of an architecture of a communications system according to an embodiment of the present invention. As shown in FIG. 1, the communications system includes user equipment (User Equipment, "UE" for short), a radio access network (Radio Access Network, "RAN" for short), a mobility management function (Mobility Management Function, "MMF" for short), and a plurality of network slices (Network Slicing) (FIG. 1 shows two network slices: a network slice 1 and a network slice 2). The network slice includes a control plane (Control Plane, "CP" for short) function (Function), a user plane (User Plane, "UP" for short) function, and a database (Database). The mobility management function MMF, the UP function, and the UP function may be referred to as core network entities. The names of the entities in the present invention are merely for convenience of description and do not constitute any limitation.

As shown in FIG. 1, the UE is connected to the MMF by using an interface N1, the UE is connected to the RAN by using an interface N2, the RAN is connected to the MMF by using an interface N3, the MMF is connected to the CP function in the network slice 1 and the CP function in the network slice 2 by using interfaces N4, the CP function is connected to the UP function by using an interface N5, and the CP function is connected to the database by using an interface N6. The serial number of the interface is merely for convenience of description and is not used to limit an interface type.

In the communications system shown in FIG. 1, the CP function is responsible for UE registration and session management, the UP function is configured to bear a specific service of the UE, and the database is configured to store information related to the UE, such as a UE identifier, a serial number, routing information, security information, location information, and profile (Profile) information. The MMF is responsible for location area management, connection mode (including an idle (Idle) mode and a connected (connected) mode) management, and handover (Handover)

management of the UE. The UE performs NAS communication with the CP function in the network slice by using the RAN and the MMF, and the UE performs data communication with the UP function in the network slice by using the RAN.

In this embodiment of the present invention, a network slice is obtained by segmenting a network based on a service requirement. For example, for an Internet of Things communication service, this kind of communication service involves a huge quantity of user equipments, each user equipment transmits an extremely small amount of information and moves infrequently, and therefore a control plane entity that can control a large quantity of devices and has a relatively weak function of a mobility management module and a user plane entity with a relatively weak data forwarding capability may be grouped into a network slice. For a mobile broadband (Mobile Broadband, "MBB" for short) service, in this kind of service, user equipment has high requirements for mobility management and quality of service (Quality of Service, "QoS" for short), and therefore a control plane entity that has a relatively strong function of a mobility management module and a user plane entity with a relatively strong data forwarding capability may be grouped into a network slice. For an industrial application service, a control plane entity that has a relatively weak function of a mobility management module but is relatively close to user equipment and a user plane entity that is relatively close to user equipment may be grouped into a network slice.

The following describes a wireless communication method in the embodiments of the present invention with reference to specific embodiments. In the embodiments of the present invention, various "messages" are merely carriers used to bear information or content, and are not limited to specific names.

For ease of description, a signaling connection between UE and an MMF is referred to as a mobility management (Mobile Management, "MM" for short) connection, a signaling connection between the MMF and a CP function is referred to as a connected management (Connected Management, "CM" for short) connection, and a signaling connection between the UE and the CP function is referred to as a NAS connection. The MM connection is used by the MMF to manage a mobility status of the UE, for example, manage an attach (Attach) state or a detach (Detach) state of the UE in a network slice, and record a latest location of the UE (location update management); and to manage a connection mode of the UE, for example, establish or delete a signaling connection between the UE and the CP function, and store a signaling connection state between the UE and the CP function (connected or disconnected).

Figure 2:
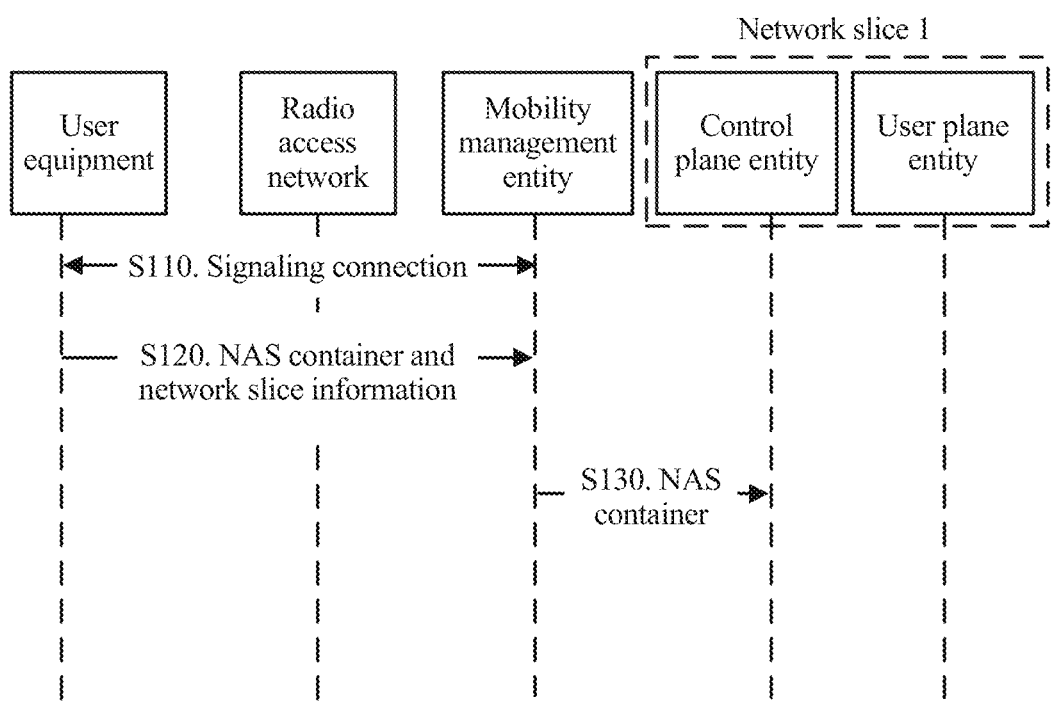
FIG. 2 is a schematic flowchart of a wireless communication method according to an embodiment of the present invention.

FIG. 2 shows a schematic flowchart of a wireless communication method according to an embodiment of the present invention. As shown in FIG. 2, the method 100 includes the following steps.

S110. Establish a signaling connection between a mobility management function MMF and user equipment UE.

Figure 3:
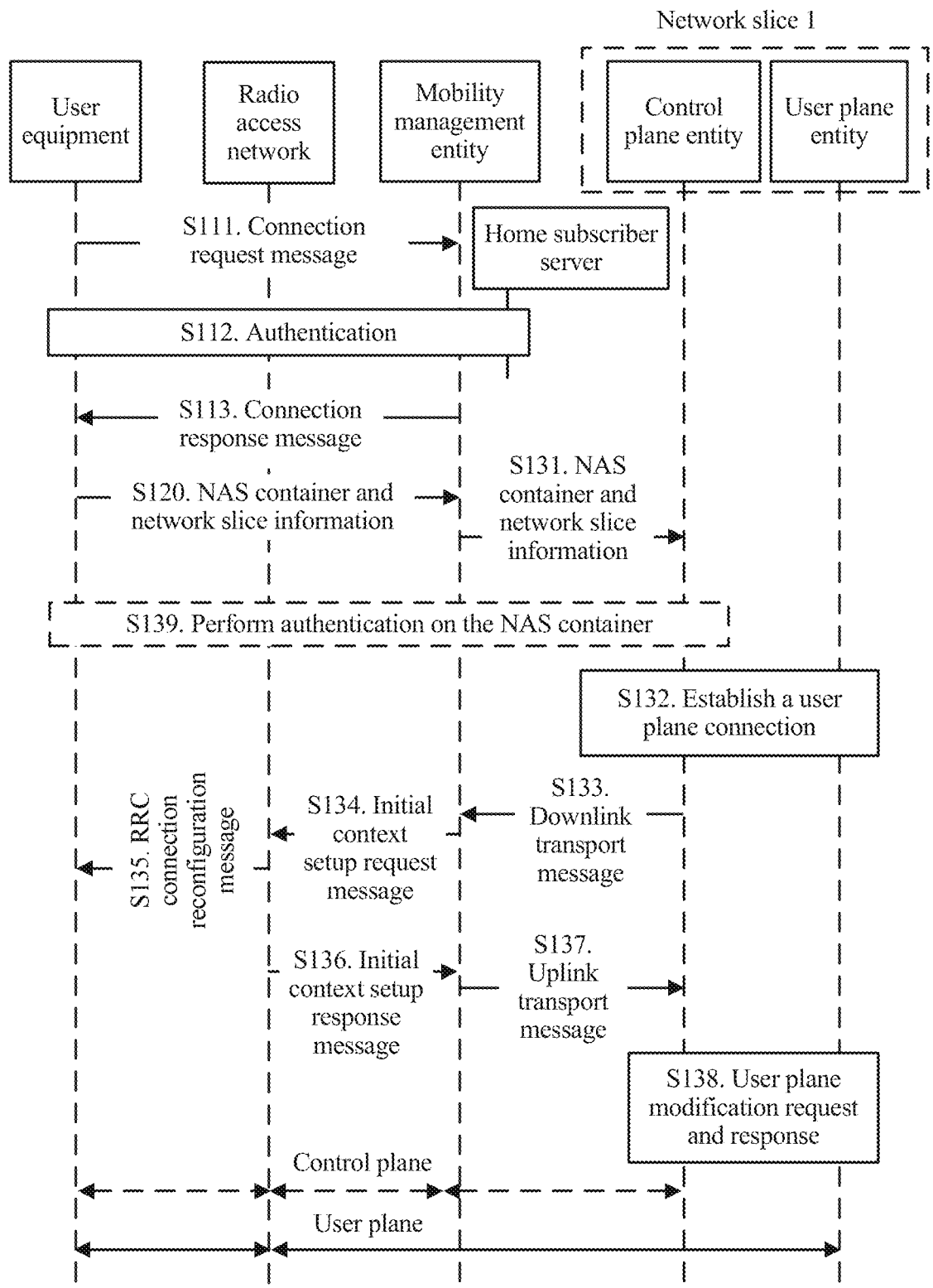
FIG. 3 is another schematic flowchart of a wireless communication method according to an embodiment of the present invention.

Specifically, as shown in FIG. 3, S110 may specifically include the following steps.

S111. The UE sends a connection request (Connection Request) message to the MMF, to request to establish an MM connection between the UE and the MMF.

The connection request message includes UE information (Information, "Info" for short) that is used by the MMF to identify the UE. Optionally, if the UE is powered on for the first time, the UE Info is an international mobile subscriber identity (International Mobile Subscriber Identity, "IMSI" for short) of the UE; or if the UE is powered on not for the first time, the UE Info is a temporary identity, and the temporary identity is an identifier allocated by the MMF to the UE, for example, the temporary identity includes a combination of MMF Info and an MMF-temporary mobile subscriber identity (MMF-Temporary Mobile Subscriber Identity, "M-TMSI" for short).

S112. The MMF performs authentication on the UE.

If the MMF is connected to a home subscriber server (Home Subscriber Server, "HSS" for short) by using an interface, the MMF may obtain security context information, such as subscription data, of the UE from the HSS, and perform authentication on the UE based on the obtained security context information of the UE.

S113. If the MMF can authenticate the UE, the MMF determines that the UE is valid, and sends a connection response (Connection Response) message to the UE, so as to establish the MM connection between the UE and the MMF.

Figure 4A:
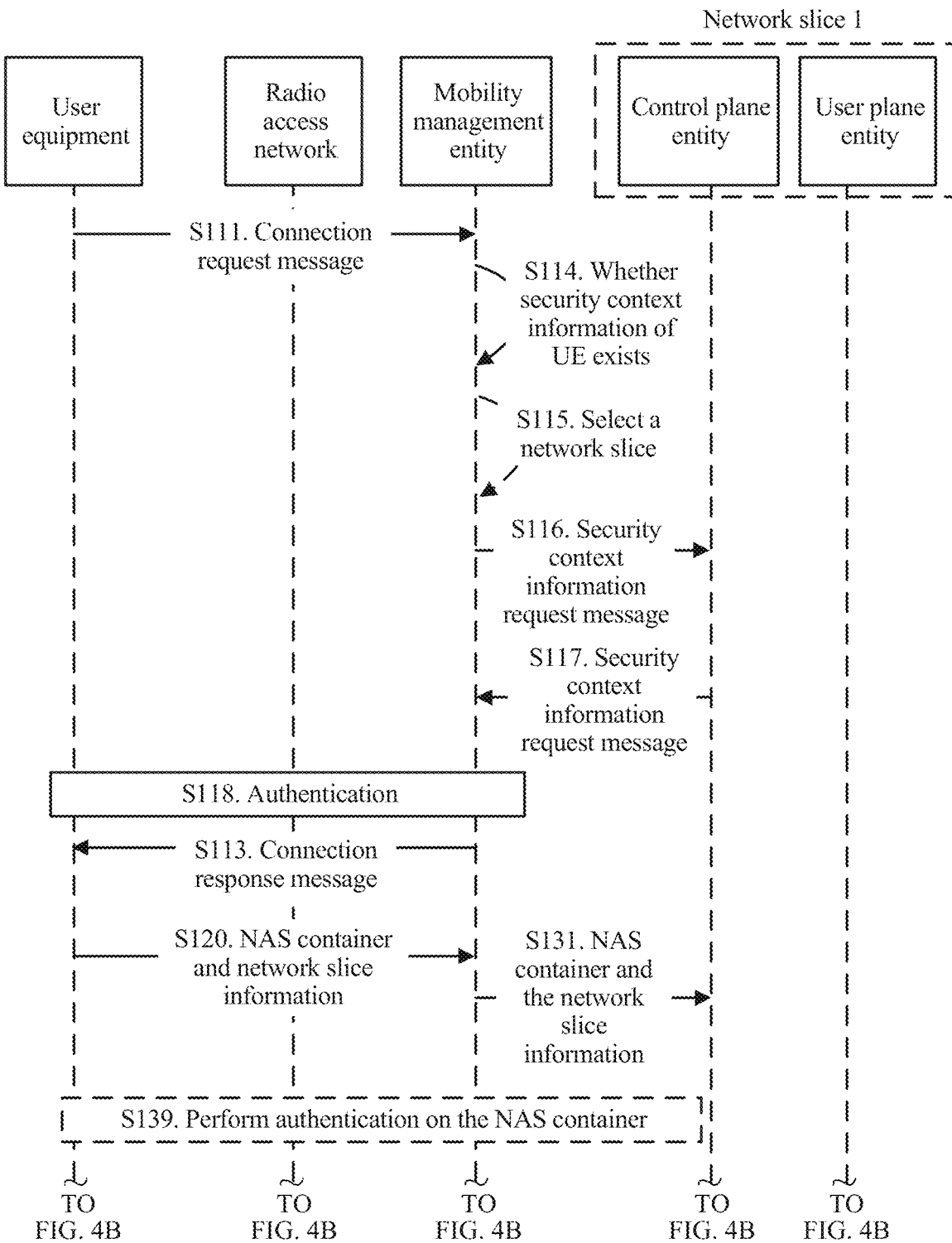
FIG. 4A and FIG. 4B are still another schematic flowchart of a wireless communication method according to an embodiment of the present invention.

Alternatively, if there is no connection between the MMF and an HSS, or if there is no independent HSS storing security context information of the UE, as shown in FIG. 4A, S110 may specifically include the following steps. S111. The UE sends a connection request (Connection Request) message to the MMF, to request to establish an MM connection between the UE and the MMF.

The connection request in FIG. 4A further includes network slice information (Network Slicing Info) in addition to the UE Info.

S114. The MMF determines whether the MMF stores security context information of the UE.

The network slice info may be an identifier of a slice to which the UE previously connects. Alternatively, the network slice info may be an identifier of a slice that the UE has not connected to before, or may be a data transmission requirement that needs to be supported by a network slice to which the UE expects to connect, for example, a high-bandwidth data transmission requirement, a high-reliability data transmission requirement, and a small data transmission requirement. In this case, the MMF determines whether the MMF stores security context information of the UE that is related to a network slice identified by the network slice info; and if the security context information of the UE exists, the MMF executes S118 and subsequent steps; or if the security context information of the UE does not exist, the MMF executes S115 and subsequent steps.

S115. The MMF selects a slice based on network slice info.

Optionally, the MMF selects, from network slices indicated by the network slice info, a network slice whose load is relatively low or a network slice whose priority is higher than a preset priority.

S116. The MMF sends a security context information request (Secure Info Request) message to a CP function in the selected slice, to request to obtain security context information of the UE from the selected network slice 1.

S117. The CP function in the network slice 1 returns the security context information of the UE to the MMF.

S118. The MMF performs authentication on the UE based on the obtained security context information of the UE.

S113. If the MMF can authenticate the UE, the MMF determines that the UE is valid, and sends a connection response (Connection Response) message to the UE, so as to establish the MM connection between the UE and the MMF.

S120. The UE sends a non-access stratum (Non-Access Stratum, "NAS" for short) container (Container) and network slice info to the MMF, and the MMF does not parse or cannot parse content in the NAS Container.

The UE may send an MM uplink transport (Uplink Transport) message to the MMF by using the MM connection. The message is used to request the MMF to forward a NAS message in the NAS container to the CP function in the network slice 1. That the NAS message is an attach request (Attach Request) message is used as an example. The NAS container in the MM uplink transport message carries the attach request message. Optionally, the network slice info is an identifier of a network slice with which the UE requests to register, or may be a data transmission requirement that needs to be supported by a network slice that the UE requests to access.

S130. The MMF sends the NAS container to the CP function of the network slice 1, so that the CP function performs NAS communication based on a NAS message in the NAS container by using a NAS connection between the CP function and the UE.

Figure 4B:
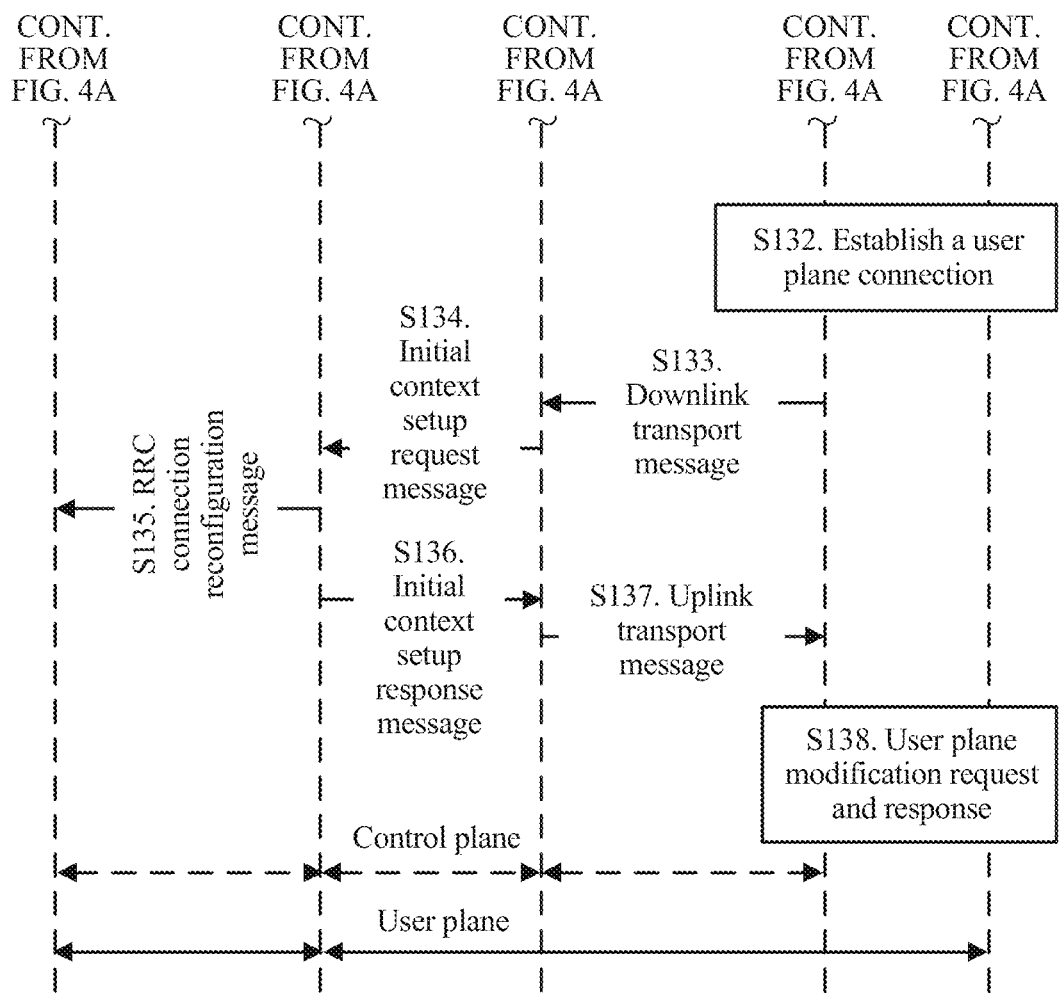

Specifically, as shown in FIG. 3, FIG. 4A, and FIG. 4B, S130 includes the following steps:

S131. The MMF sends a connection management (Connection Management, "CM" for short) uplink transport message to the CP function, where the CM uplink transport message includes identification information of the MMF and the NAS container, received in S120, that includes an attach request message and that is sent by the UE.

Specifically, the MMF sends the CM uplink transport message to the CP function by using a CM connection between the MMF and the CP function. Because the CM uplink transport message sent by the MMF to the CP function includes the identification information of the MMF, in a process of interaction between a UP function and the UE, the UP function can determine, based on the stored identification information of the MMF, the MMF that can be used when the UP function sends signaling to the UE, and send the signaling to the UE by using the MMF that can be used.

Optionally, after receiving the CM uplink transport message sent by the MMF, the CP function executes, based on a security requirement, S139: Perform authentication on the NAS message sent by the UE.

S132. The CP function instructs a UP function to establish a user plane connection for the UE.

S133. The CP function sends a CM downlink (Downlink) transport message to the MMF.

The CM downlink transport message is used to send a NAS message to the UE and establish the user plane connection for the UE. The message includes a NAS container and an RAN container. The NAS container includes the NAS message to be sent to the UE. The NAS message may be specifically an attach accept (Attach Accept) message. The attach accept message is used to indicate that the attach request of the UE has been accepted. The MMF does not parse or cannot parse content in the NAS container. The RAN container carries information related to a user plane connection. The information related to a user plane connection may specifically include an Internet Protocol (Internet Protocol, "IP" for short) address of the UP function and/or a tunnel identifier ID allocated by the UP function to the UE, so that an RAN can establish a user plane connection to the UP function based on the information related to a user plane connection. The MMF does not parse or cannot parse content in the RAN container.

S134. The MMF sends an Initial Context Setup Request (Initial Context Setup Request) message to an RAN.

The Initial Context Setup Request message includes the NAS container and the RAN container that are received by the MMF in S133, and may further include the UE info and the network slice info. Optionally, the network slice info is independent information, or is carried in the UE info and is a part of the UE info. The network slice info is used by the RAN to record a correspondence between an identifier of a data radio bearer between the UE and the RAN and a connection identifier of the connection between the RAN and the UP function. Specifically, the following relationship may be recorded:

the identifier of the data radio bearer between the UE and the RAN+the network slice info↔the connection identifier of the connection between the RAN and the UP function.

S135. The RAN sends a radio resource control (Radio Resource Control, "RRC" for short) connection reconfiguration (Connection Reconfiguration) message to the UE.

The RRC connection reconfiguration message sent by the RAN to the UE includes the NAS container received in S134. The UE performs RRC connection reconfiguration after receiving the RRC connection reconfiguration message, and returns an RRC reconfiguration complete message to the RAN after completing the RRC connection reconfiguration. In addition, the UE records a correspondence between a connection identifier of a connection between the UE and the RAN, quality of service (quality of service, "QoS" for short), and the network slice info.

S136. The RAN sends an Initial Context Setup Response (Initial Context Setup Response) message to the MMF.

The Initial Context Setup Response message includes an RAN container and the UE info. The RAN container includes information related to the user plane connection established on the RAN side. The information related to the user plane connection established on the RAN side includes an identifier of the RAN and/or the user plane tunnel ID. The MMF does not parse or cannot parse content in the RAN container sent by the RAN.

S137. The MMF sends a CM uplink transport message to the CP function.

The CM uplink transport message includes the UE info and the RAN container, received in S136, that is sent by the RAN.

S138. The CP function sends a user plane modification request to the UP function, and receives a modification response sent by the UP function, where the user plane modification request carries an RAN container received in S137, so that the UP function establishes a user plane connection to the RAN.

Figure 5:
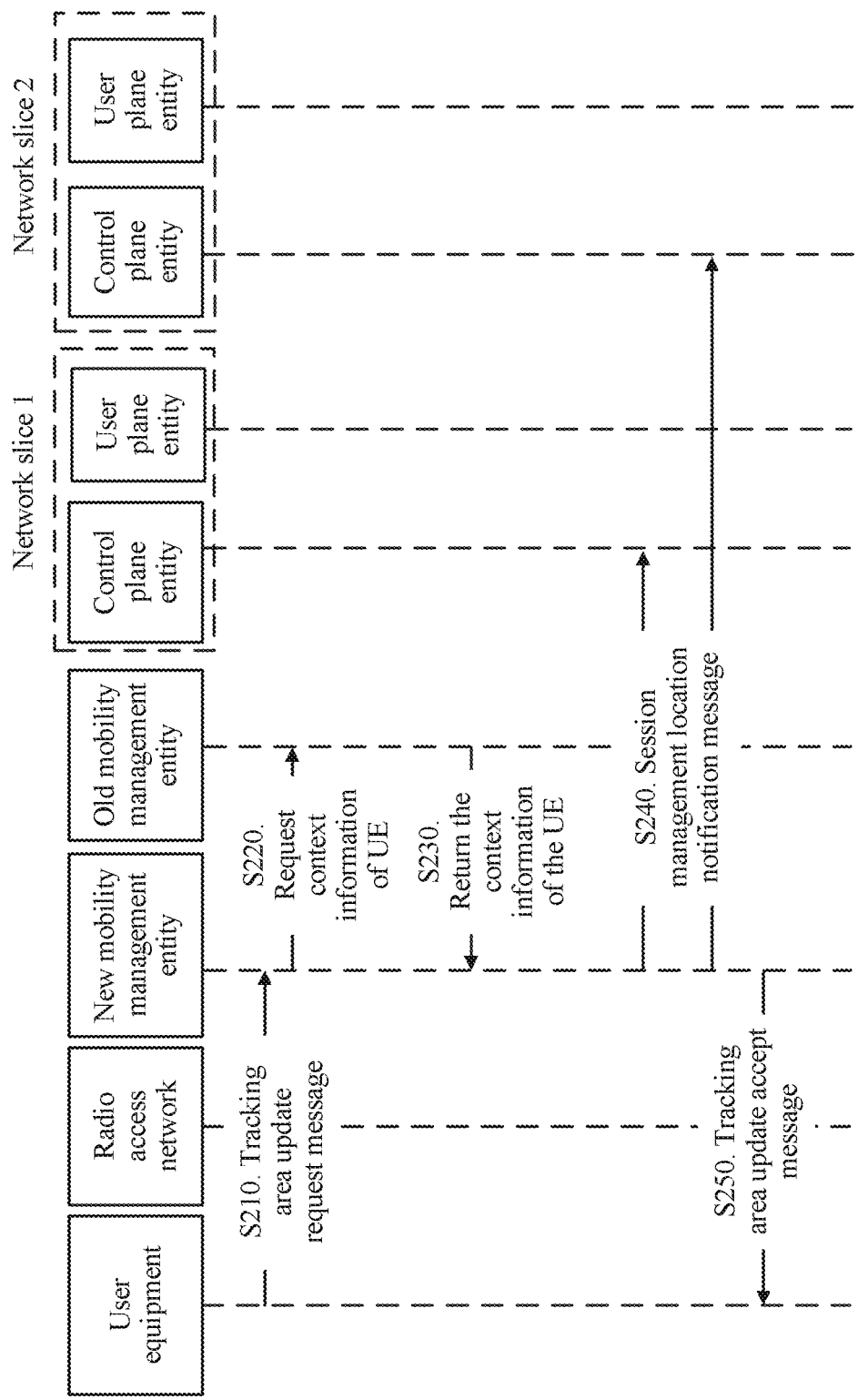
FIG. 5 is a schematic flowchart of a location update method according to an embodiment of the present invention.

Therefore, by using the procedure of the method 100, the UE completes the attach process and registers with the network slice. When the UE detects that the UE enters a new location area, for example, a new tracking area (Tracking Area, "TA" for short) (a TA identity (Identity) of the TA is not included in a TAI list registered by the UE), or when a periodic TA update timer of the UE expires, a location update process is triggered. FIG. 5 shows a schematic flowchart of a location update method according to an embodiment of the present invention. As shown in FIG. 5, the method 200 includes the following steps.

S210. UE sends an MM tracking area update (tracking area update, "TAU" for short) request message to a new (New) MMF.

The MM TAU request message carries a location area in which the UE currently located and a temporary identity allocated by an old (Old) MMF to the UE. The temporary identity includes an identifier of the old MMF. The new MMF determines the old MMF based on the identifier of the old MMF.

S220. The new MMF requests context information of the UE from an old MMF.

S230. The old MMF returns the context information of the UE to the new MMF.

Specifically, the context information of the UE includes identification information of the UE, security context information of the UE, subscription information of the UE, and network slice info. The network slice info includes information about network slices with which the UE currently registers, and an address of a CP function in each network slice. As shown in FIG. 5, the network slice info indicates that the UE registers with a network slice 1 and a network slice 2.

S240. The MMF sends a session management (Session Management, "SM" for short) location notification (Location Notification) message to a CP function in a network slice indicated by network slice info.

The SM location notification message carries information about the new MMF (for example, address information), so that the CP function can determine the new MMF subsequently based on the information about the new MMF, and send signaling to the UE by using the new MMF.

S250. The new MMF sends a TAU accept message to the UE, where the TAU accept message includes a temporary identity allocated by the new MMF to the UE.

Optionally, in S240, the new MMF sends a location update message to an HSS, to notify the HSS of TAU information related to the UE and notify the HSS that the UE is currently served by the new MMF. The HSS sends location delete information to the old MMF, to notify the old MMF that the UE has roamed to another location and require the old MMF to delete information related to the UE. The old MMF sends a location delete acknowledgement message to the HSS to respond to the location delete request of the HSS. In this implementation, the CP function needs to find, by using the HSS, the MMF that currently serves the UE, and sends signaling to the UE by using the found MMF.

Figure 6:
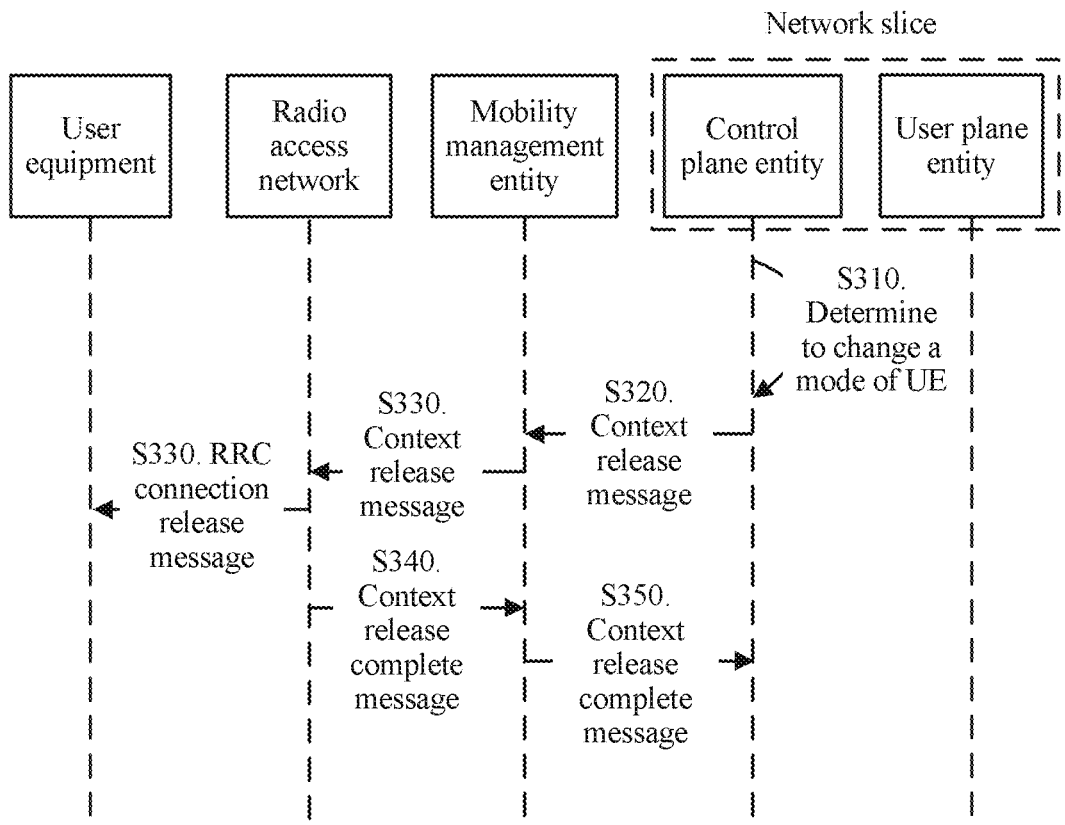
FIG. 6 is a schematic flowchart of a method for changing a mode of UE from a connected mode to an idle mode according to an embodiment of the present invention.

Optionally, after the UE completes the attach process by using the procedure of the method 100, and registers with the network slice, if the UE does not receive or send data within a period of time, or if the UE expects to enter an idle (Idle) mode, a procedure of switching the UE from a connected (Connected) mode to the idle mode is triggered. FIG. 6 shows a method for switching UE from a connected mode to an idle mode according to an embodiment of the present invention. As shown in FIG. 6, the method 300 includes the following steps:

S310. A CP function determines that the UE needs to switch from the connected mode to the idle mode.

Specifically, if a UP function determines that the UE does not receive or send data within a period of time, the UP function sends indication information to the CP function. The CP function determines, based on the indication information, that the UE needs to enter a CM idle mode. Alternatively, the UE expects to enter the idle mode in a network slice, and sends a NAS release request message to the CP function, and the CP function determines, based on the NAS release request message, that the UE needs to enter a CM idle mode.

S320. The CP function sends a CM UE context release (Context Release) message to an MMF.

After receiving the CM UE context release message, the MMF deletes context information of the UE that is locally stored.

S330. The MMF sends a context release message to an RAN.

After receiving the context message sent by the MMF, the RAN releases a user plane connection between the RAN and the UP function.

Further, if the MMF determines that a network slice in which the UE requests to enter the idle mode is a last network slice in which the UE is in the connected mode, the context release message sent by the MMF to the RAN in S330 includes an RRC release indication message. In this case, the RAN releases a control plane connection and a user plane connection between the RAN and the UE based on the RRC release indication message.

S340. The RAN sends an MM UE context release complete message to the MMF.

S350. The MMF sends a CM context release complete message to the CP function.

The UE switches from the connected mode to the idle mode by using the foregoing procedure of the method 300.

Figure 7:
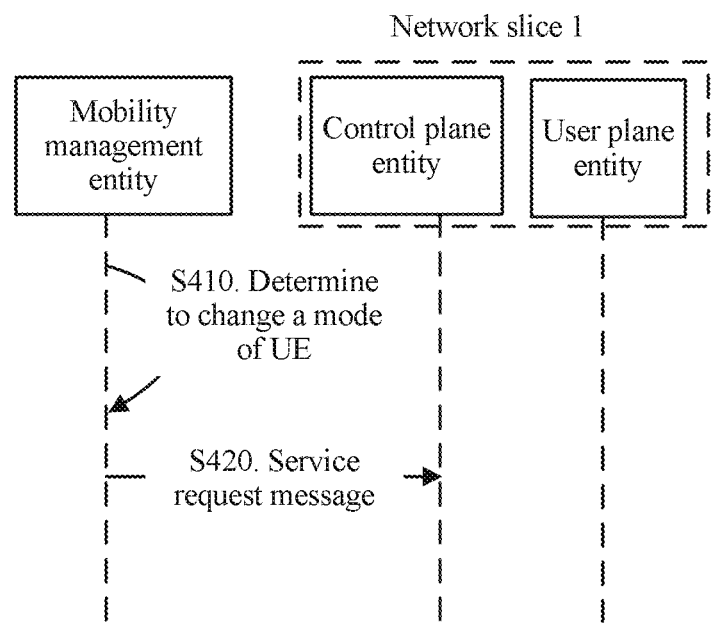
FIG. 7 is a schematic flowchart of a method for changing a mode of UE from an idle mode to a connected mode according to an embodiment of the present invention.

After the UE switches from the connected mode to the idle mode, when the UE needs to be served, for example, when the UE initiates a call or is called, a procedure of switching the UE from the idle mode to the connected mode is triggered. FIG. 7 shows a method of switching UE from an idle mode to a connected mode according to an embodiment of the present invention. As shown in FIG. 7, the method 400 includes:

S410. An MMF determines that the user equipment UE needs to change from the idle mode to the connected mode in a network slice 1.

S420. The MMF sends a CM service request (Service Request) message to a CP function.

The CM service request message is used to request to change a mode of the UE to the connected mode.

Figure 8:
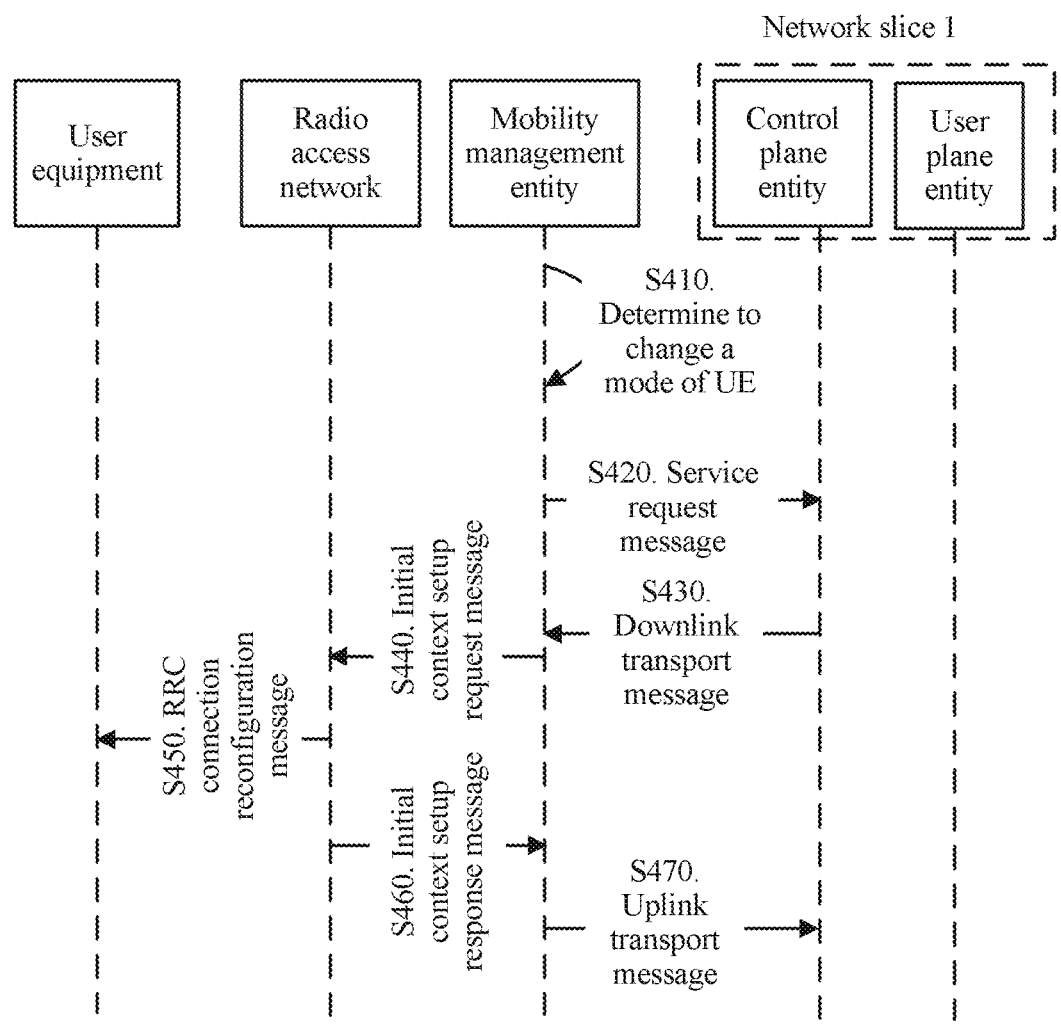
FIG. 8 is another schematic flowchart of a method for changing a mode of UE from an idle mode to a connected mode according to an embodiment of the present invention.

Further, as shown in FIG. 8, the method 400 further includes the following steps.

S430. The CP function sends a CM downlink transport message to the MMF.

Specifically, the CP function obtains context information of the UE from information stored by the CP function. The context information of the UE includes bearer information of the UE and a tunnel ID allocated by the CP function to each bearer. Then, the CP function sends the CM downlink transport message to the MMF. The CM downlink transport message includes a NAS container and an RAN container. The NAS container includes a NAS message to be sent to the UE. The NAS message may be specifically connected indication (Connected Indication) information. The connected indication information is used to notify that the UE has entered the connected mode in the network slice 1 in which the CP function is located. The UE may send a message to the CP function by using the MMF. The RAN container carries information related to a user plane connection. The information related to a user plane connection includes an IP address of a UP function that establishes a user plane connection to the CP function and/or a tunnel ID allocated by the UP function to the UE, so that an RAN establishes a user plane connection for the UE based on the information related to a user plane connection. The MMF does not parse or cannot parse content in the RAN container.

S440. The MMF sends an Initial Context Setup Request (Initial Context Setup Request) message to an RAN.

The Initial Context Setup Request message includes the NAS container and the RAN container that are received in S430. The Initial Context Setup Request message may further carry UE info and network slice info. The network slice info may be independent information, or may be carried in the UE info and be a part of the UE info. The network slice info is used by the RAN to record a correspondence between an identifier of the user plane bearer between the UE and the RAN and a connection identifier of a connection between the RAN and the UP function. Specifically, the following relationship may be recorded:

the identifier of the user plane bearer between the UE and the RAN+the network slice info↔the connection identifier of the connection between the RAN and the UP function.

S450. The RAN sends an RRC connection reconfiguration message to the UE.

The RRC connection reconfiguration message sent by the RAN to the UE includes the NAS container, received in S440, that is sent by the MMF. The UE performs RRC connection reconfiguration after receiving the RRC connection reconfiguration message, and returns an RRC reconfiguration complete message to the RAN after completing the RRC connection reconfiguration. In addition, the UE records a correspondence between the connection identifier of the user plane connection between the UE and the RAN, quality of service (quality of service, "QoS" for short), and the network slice info.

S460. The RAN sends an Initial Context Setup Response message to the MMF.

S470. The MMF sends a CM uplink transport message to the CP function.

A specific implementation method of S460 is the same as that of S136. A specific implementation method of S470 is the same as that of S137. To avoid repetition, details are not described herein again.

Optionally, after S450, the UE sends data. Specifically, after receiving a data request at an application layer, the UE determines QoS and network slice info that are corresponding to the data, and sends the data to a data radio bearer that is between the UE and the RAN and that is corresponding to the QoS. The data carries the network slice info. The RAN determines, based on a previously stored correspondence: an identifier of a data radio bearer between the UE and the RAN+network slice info↔a connection identifier of a connection between the RAN and the UP function, a user plane connection that is between the RAN and the UP function and that needs to be used, and sends the data to the user plane connection.

Figure 9:
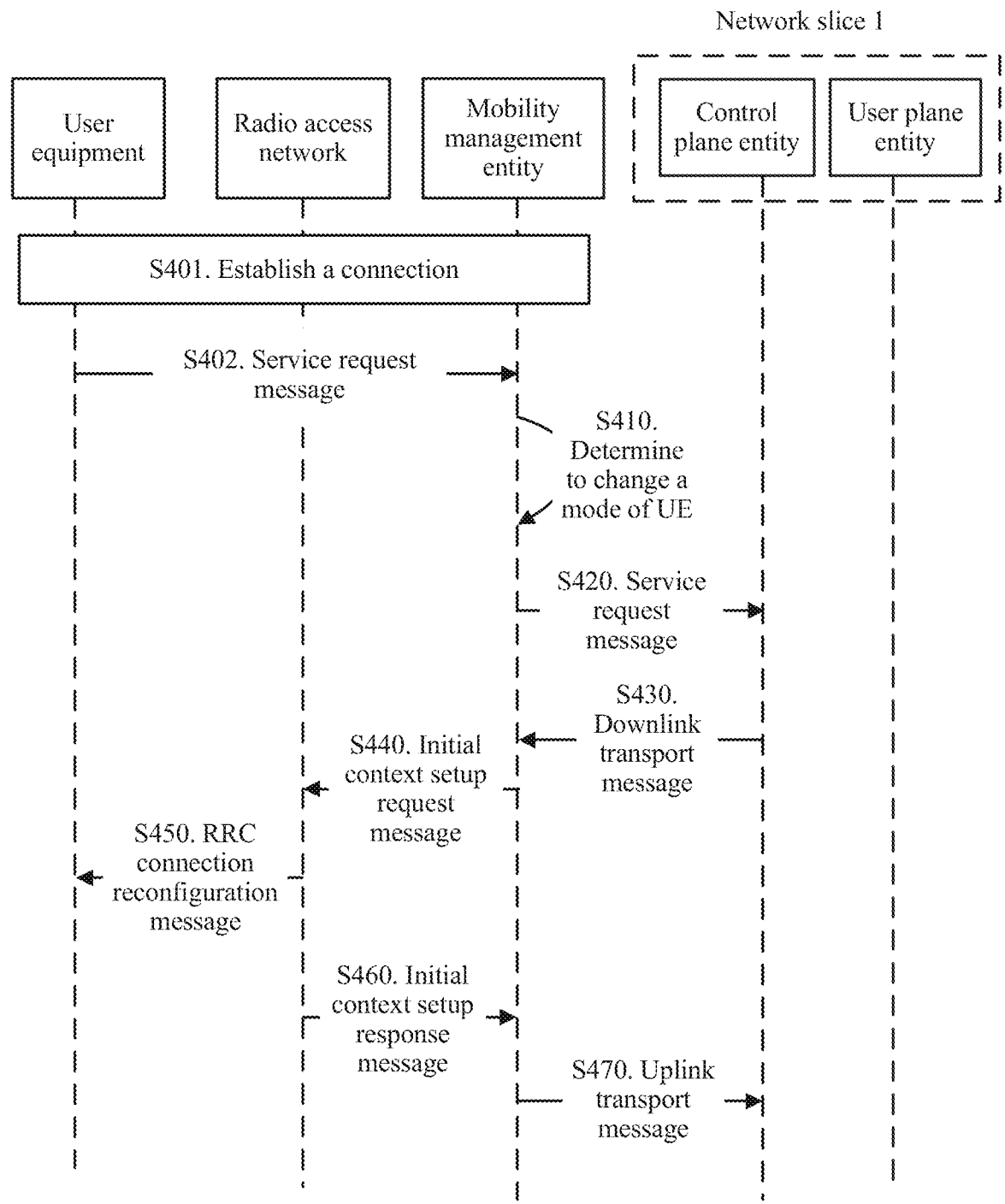
FIG. 9 is still another schematic flowchart of a method for changing a mode of UE from an idle mode to a connected mode according to an embodiment of the present invention.

Specifically, as shown in FIG. 9, when a procedure of switching the UE from an idle mode to a connected mode is triggered because the UE initiates a call, the method 400 further includes:

S401. The UE establishes a connection to the MMF.

A specific implementation method of S401 is the same as that of S110. To avoid repetition, details are not described herein again.

S402. The UE sends an MM service request message to the MMF.

The MM service request message is used to request to enter the connected mode, and the MM service request message includes UE info and network slice info. In this case, in S410, the MMF may determine, based on the network slice info, the network slice 1 to which the UE requests to establish a connection.

Figure 10:
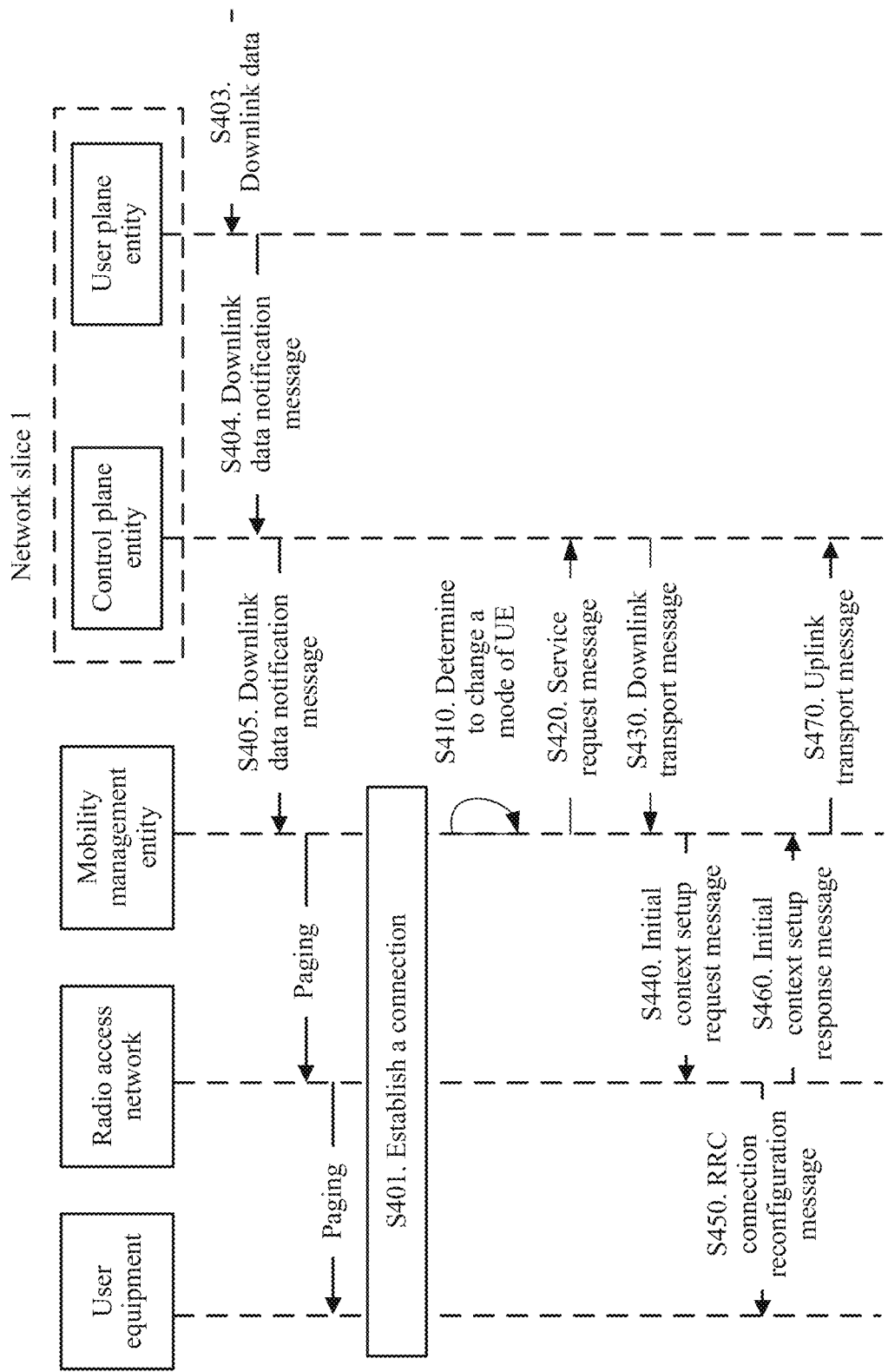
FIG. 10 is yet another schematic flowchart of a method for changing a mode of UE from an idle mode to a connected mode according to an embodiment of the present invention.

Alternatively, as shown in FIG. 10, when a procedure of switching the UE from an idle mode to a connected mode is triggered because the UE is called, the method 400 further includes:

S403. A UP function receives downlink data.

S404. The UP function sends a downlink data notification (Downlink Data Notification) message to the CP function.

The downlink data notification message is used to notify the CP function that the UP function in the network slice 1 in which the CP function is located receives the downlink data that is sent by a network and whose destination IP address is an IP address of the UE, but there is no user plane connection used for transmitting the downlink data to the UE.

S405. The CP function sends a CM downlink data notification message to the MMF.

The CM downlink data notification message is used to notify the MMF that a mode of the UE needs to be changed to the connected mode.

In addition, before S420 is executed, the MMF needs to determine whether a connection to the UE is established; and if the connection has been established, S420 and subsequent steps are directly executed; or if currently no connection is established between the MMF and the UE, the MMF initiates paging on the UE, and establishes an MM connection to the UE according to the specific method in S401, and then S420 and subsequent steps are executed.

Figure 11:
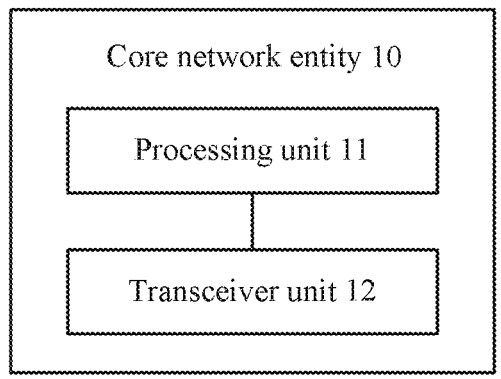
FIG. 11 is a schematic block diagram of a core network entity according to an embodiment of the present invention.

With reference to FIG. 2 to FIG. 10, the wireless communication methods according to the embodiments of the present invention are described above in detail, and with reference to FIG. 11, a core network entity according to an embodiment of the present invention is described in detail in the following. The core network entity is applied to a communications system. The communications system includes user equipment UE, a radio access network RAN, the core network entity, and at least one network slice. As shown in FIG. 11, the core network entity 10 includes:

a processing unit 11, configured to establish a signaling connection to the UE; and a transceiver unit 12, configured to receive network slice information and a non-access stratum NAS message that are sent by the UE over the signaling connection.

The transceiver unit 12 is further configured to determine a target network slice from the at least one network slice based on the network slice information, where the target network slice includes a second core network entity, and the UE performs NAS communication with the second core network entity by using the RAN and the core network entity.

The transceiver unit 12 is further configured to send the NAS message to the second core network entity.

Therefore, the core network entity according to this embodiment of the present invention can forward NAS messages of the UE to core network entities in a plurality of network slices, and the UE does not need to establish a signaling connection to a core network entity in each network slice to transmit the NAS message, so that an amount of signaling in a communication process can be reduced, and network management and maintenance efficiency can be improved.

In this embodiment of the present invention, optionally, the network slice information is a network slice identifier or a data transmission requirement that a network slice needs to support.

The processing unit 11 is specifically configured to: determine a network slice corresponding to the network slice identifier as the target network slice; or determine the network slice supporting the data transmission requirement as the target network slice.

In this embodiment of the present invention, optionally, the NAS message is an attach request message. The transceiver unit 12 is specifically configured to send the attach request message and identification information of the core network entity to the second core network entity, so that after registering the UE with the target network slice based on the attach request message, the second core network entity sends the NAS message to the UE based on the identification information of the core network entity.

In this embodiment of the present invention, optionally, the target network slice further includes a third core network entity, and the UE performs data communication with the third core network entity by using the RAN.

After the transceiver unit 12 sends the attach request message and the identification information of the core network entity to the second core network entity, the transceiver unit 12 is further configured to: receive user plane information sent by the second core network entity, where the user plane information is used by the RAN to establish a user plane connection to the third core network entity; and send the user plane information to the RAN, so that the RAN establishes the user plane connection to the third core network entity based on the user plane information.

In this embodiment of the present invention, optionally, the transceiver unit 12 is further configured to send the network slice information to the RAN, so that the RAN stores a correspondence between a data radio bearer DRB between the RAN and the UE plus the network slice information, and the user plane connection between the RAN and the third core network entity.

In this embodiment of the present invention, optionally, the transceiver unit 12 is further configured to receive a first location update request message sent by the UE, where the first location update request message carries a temporary identity of the UE, the first location update request message is used to notify the core network entity of a location area in which the UE is currently located, and the temporary identity is allocated, to the UE, by a core network entity that serves the UE before the UE sends the first location update request message to the core network entity;

the processing unit 11 is further configured to determine, based on the temporary identity of the UE, a fourth core network entity in a network slice with which the UE currently registers; and the transceiver unit 12 is further configured to send the identification information of the core network entity to the fourth core network entity, so that the fourth core network entity sends the NAS message to the UE based on the identification information of the core network entity.

The core network entity 10 according to this embodiment of the present invention may correspond to the MMF in the methods according to the embodiments of the present invention. In addition, units and modules in the core network entity 10 and the foregoing and other operations and/or functions are respectively intended to implement corresponding procedures of the method 100 and the method 200. For brevity, details are not described herein.

The core network entity according to this embodiment of the present invention can forward NAS messages of the UE to core network entities in a plurality of network slices, and the UE does not need to establish a signaling connection to a core network entity in each network slice to transmit the NAS message, so that an amount of signaling in a communication process can be reduced, and network management and maintenance efficiency can be improved.

Figure 12:
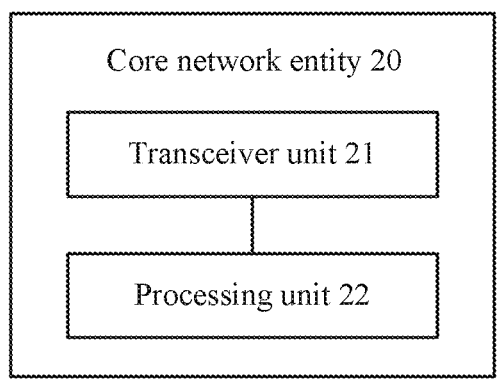
FIG. 12 is a schematic block diagram of a core network entity according to another embodiment of the present invention.

With reference to FIG. 12, a core network entity according to another embodiment of the present invention is described in detail in the following. The core network entity is applied to a communications system. The communications system includes user equipment UE, a radio access network RAN, a first core network entity, and at least one network slice. A target network slice in the at least one network slice includes the core network entity. The UE performs non-access stratum NAS communication with the core network entity by using the RAN and the first core network entity. As shown in FIG. 12, the core network entity 20 includes:

a transceiver unit 21, configured to receive a NAS message sent by the first core network entity, where the target network slice is determined by the first core network entity based on network slice information sent by the UE, and the NAS message is sent by the UE to the first core network entity; and a processing unit 22, configured to perform NAS communication with the UE based on the NAS message.

Therefore, the core network entity according to this embodiment of the present invention can receive the NAS message of the UE that is forwarded by a core network entity outside the network slice, and the UE does not need to establish a signaling connection to a core network entity in each network slice to transmit the NAS message, so that an amount of signaling in a communication process can be reduced, and network management and maintenance efficiency can be improved.

In this embodiment of the present invention, optionally, the NAS message is an attach request message.

The transceiver unit 21 is specifically configured to receive the attach request message and identification information of the first core network entity that are sent by the first core network entity. The processing unit 22 is specifically configured to register the UE with the target network slice based on the attach request message. The transceiver unit 21 is specifically configured to send a NAS message to the UE based on the identification information of the first core network entity.

In this embodiment of the present invention, optionally, the target network slice further includes a third core network entity, and the UE performs data communication with the third core network entity by using the RAN.

After the transceiver unit 21 receives the attach request message and the identification information of the first core network entity that are sent by the first core network entity, the transceiver unit 21 is further configured to send user plane information to the first core network entity, where the user plane information is used by the RAN to establish a user plane connection to the third core network entity, so that the first core network entity sends the user plane information to the RAN, and the RAN establishes the user plane connection to the third core network entity based on the user plane information.

The core network entity 20 according to this embodiment of the present invention may correspond to the CP function in the methods according to the embodiments of the present invention. In addition, units and modules in the core network entity 20 and the foregoing and other operations and/or functions are respectively intended to implement corresponding procedures of the method 100 and the method 200. For brevity, details are not described herein.

The core network entity according to this embodiment of the present invention can receive the NAS message of the UE that is forwarded by a core network entity outside the network slice, and the UE does not need to establish a signaling connection to a core network entity in each network slice to transmit the NAS message, so that an amount of signaling in a communication process can be reduced, and network management and maintenance efficiency can be improved.

Figure 13:
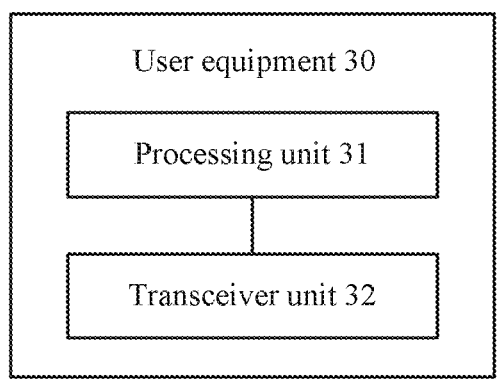
FIG. 13 is a schematic block diagram of user equipment according to an embodiment of the present invention.

FIG. 13 shows user equipment according to an embodiment of the present invention. The user equipment is applied to a communications system, and the communications system includes the user equipment, a radio access network RAN, a first core network entity, and at least one network slice. As shown in FIG. 13, the user equipment 30 includes:

a processing unit 31, configured to establish a signaling connection to the first core network entity; and a transceiver unit 32, configured to send network slice information and a non-access stratum NAS message to the first core network entity, so that the first core network entity determines a target network slice from the at least one network slice based on the network slice information, and sends the NAS message to a second core network entity in the target network slice, where the user equipment performs NAS communication with the second core network entity by using the RAN and the first core network entity.

Therefore, the user equipment according to this embodiment sends the network slice information and the NAS message to the core network entity that has established a connection to the UE, so that the core network entity determines, based on the network slice information sent by the user equipment, the target network slice that serves the UE, and sends the NAS message to the core network entity in the target network slice. In this way, one core network entity can forward NAS messages of the UE to core network entities of a plurality of network slices, and the UE does not need to establish a signaling connection to a core network entity in each network slice to transmit the NAS message, so that an amount of signaling in a communication process can be reduced, and network management and maintenance efficiency can be improved.

In this embodiment of the present invention, optionally, the network slice information is a network slice identifier or a data transmission requirement that a network slice needs to support.

In this embodiment of the present invention, optionally, the NAS message is an attach request message.

The user equipment 30 according to this embodiment of the present invention may correspond to the user equipment in the methods according to the embodiments of the present invention. In addition, units and modules in the user equipment 30 and the foregoing and other operations and/or functions are respectively intended to implement corresponding procedures of the method 100 and the method 200. For brevity, details are not described herein.

Figure 14:
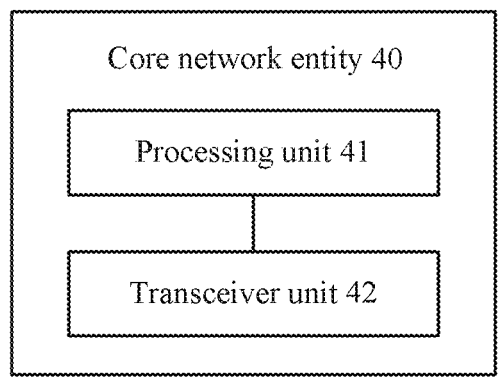
FIG. 14 is a schematic block diagram of a core network entity according to still another embodiment of the present invention.

FIG. 14 shows a core network entity according to still another embodiment of the present invention. The core network entity is applied to a wireless communications system, and the communications system includes user equipment UE, a radio access network RAN, the core network entity, and at least one network slice. As shown in FIG. 14, the core network entity 40 includes:

a processing unit 41, configured to determine that the UE needs to change from an idle mode to a connected mode in a target network slice in the at least one network slice, where the target network slice includes a second core network entity, and the UE performs non-access stratum NAS communication with the second core network entity by using the RAN and the core network entity; and a transceiver unit 42, configured to send a first message to the second core network entity, where the first message is used to request to change a mode of the UE from the idle mode to the connected mode, so that the second core network entity establishes a NAS connection to the UE based on the first message, to enable the UE to enter the connected mode.

Therefore, when determining that the UE needs to change from the idle mode to the connected mode in the target network slice, the core network entity according to this embodiment of the present invention sends the message for requesting to change the mode of the UE to the connected mode to the second core network entity in the target network slice, so that the second core network entity can establish the control plane connection to the UE based on the message sent by the core network entity, to enable the UE to enter the connected mode. In this way, it can be avoided that connection modes are difficult to manage because UE is in an idle mode in a network slice and is in a connected mode in another network slice, and network management efficiency can be improved.

In this embodiment of the present invention, optionally, the target network slice further includes a third core network entity, and the UE performs data communication with the third core network entity by using the RAN.

After the transceiver unit 42 sends the first message to the second core network entity, the transceiver unit 42 is further configured to: receive user plane information sent by the second core network entity, where the user plane information is used by the RAN to establish a user plane connection to the third core network entity; and send the user plane information to the RAN, so that the target RAN establishes the user plane connection to the third core network entity based on the user plane information.

In this embodiment of the present invention, optionally, the transceiver unit 42 is further configured to receive a second message sent by the UE, where the second message includes network slice information, and the second message is used by the UE to request to enter the connected mode in a network slice indicated by the network slice information; and the processing unit 41 is specifically configured to determine, based on the second message, that the UE needs to change from the idle mode to the connected mode in the network slice indicated by the network slice information.

In this embodiment of the present invention, optionally, the transceiver unit 42 is further configured to receive a third message sent by the second core network entity, where the third message is used to indicate that the second core network entity has data to be sent to the UE, or the third message is used to indicate that the second core network entity needs to perform NAS communication with the UE;

the processing unit 41 is specifically configured to determine, based on the third message, that the UE needs to change from the idle mode to the connected mode in the target network slice; and the transceiver unit 42 is specifically configured to send the first message to the second core network entity if the processing unit 41 determines that a signaling connection is established between the core network entity and the UE.

In this embodiment of the present invention, optionally, the transceiver unit 42 is further configured to: send a paging message to the UE if the processing unit 41 determines that no signaling connection is established between the core network entity and the UE; receive a fourth message sent by the UE based on the paging message, where the fourth message is used to request to establish a signaling connection to the core network entity; establish the signaling connection to the UE based on the fourth message; and send the first message to the second core network entity after the signaling connection to the UE is established.

In this embodiment of the present invention, optionally, the transceiver unit 42 is further configured to receive a fifth message sent by the second core network entity, where the fifth message is used to instruct the core network entity to send a sixth message to the RAN, and the sixth message is used to instruct the RAN to release the user plane connection between the RAN and the third core network entity.

In this embodiment of the present invention, optionally, after the transceiver unit 42 receives the fifth message sent by the second core network entity, if the processing unit 41 determines that the UE is in the connected mode in only the target network slice, the sixth message includes connection release information used to instruct the RAN to release a control plane connection and a user plane connection between the RAN and the UE.

In this embodiment of the present invention, optionally, the transceiver unit 42 is further configured to send a seventh message to the UE, where the seventh message is used to notify that the UE has entered the connected mode in the target network slice.

The core network entity 40 according to this embodiment of the present invention may correspond to the MMF in the methods according to the embodiments of the present invention. In addition, units and modules in the core network entity 40 and the foregoing and other operations and/or functions are respectively intended to implement corresponding procedures of the method 300 and the method 400. For brevity, details are not described herein.

When determining that the UE needs to change from the idle mode to the connected mode in the target network slice, the core network entity according to this embodiment of the present invention sends the message for requesting to change the mode of the UE to the connected mode to the second core network entity in the target network slice, so that the second core network entity can establish the control plane connection to the UE based on the message sent by the core network entity, to enable the UE to enter the connected mode. In this way, it can be avoided that connection modes are difficult to manage because UE is in an idle mode in a network slice and is in a connected mode in another network slice, and network management efficiency can be improved.

Figure 15:
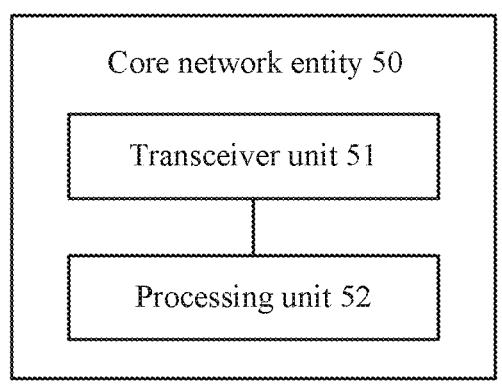
FIG. 15 is a schematic block diagram of a core network entity according to still another embodiment of the present invention.

FIG. 15 shows a core network entity according to still another embodiment of the present invention. The core network entity is applied to a communications system. The communications system includes user equipment UE, a radio access network RAN, a first core network entity, and at least one network slice. A target network slice in the at least one network slice includes the core network entity. The UE performs non-access stratum NAS communication with the core network entity by using the RAN and the first core network entity. As shown in FIG. 15, the core network entity 50 includes:

a transceiver unit 51, configured to send a first message to the first core network entity, where the first message is used to indicate that the core network entity has data to be sent to the UE, or the first message is used to indicate that the core network entity needs to perform NAS communication with the UE, so that the first core network entity determines, based on the first message, that the UE needs to change from an idle mode to a connected mode in the target network slice; where the transceiver unit 51 is further configured to receive a second message sent by the first core network entity, where the second message is used to request to change a mode of the UE from the idle mode to the connected mode; and a processing unit 52, configured to establish a NAS connection to the UE based on the second message, to enable the UE to enter the connected mode.

Therefore, the core network entity according to this embodiment of the present invention receives the message that is for requesting to change the mode of the user equipment UE to the connected mode and that is sent by a core network entity outside the network slice to which the core network entity belongs, and establishes a control plane connection to the UE based on the message, to enable the UE to enter the connected mode. In this way, it can be avoided that connection modes are difficult to manage because UE is in an idle mode in a network slice and is in a connected mode in another network slice, and network management efficiency can be improved.

In this embodiment of the present invention, optionally, the target network slice further includes a third core network entity, and the UE performs data communication with the third core network entity by using the RAN.

After the transceiver unit 51 receives the second message sent by the first core network entity, the transceiver unit 51 is further configured to send user plane information to the first core network entity, where the user plane information is used by the RAN to establish a user plane connection to the third core network entity, so that the first core network entity sends the user plane information to the RAN, and the RAN establishes the user plane connection to the third core network entity based on the user plane information.

In this embodiment of the present invention, optionally, the transceiver unit 51 is further configured to send a third message to the first core network entity, where the third message is used to instruct the first core network entity to send a fourth message to the RAN, and the fourth message is used to instruct the RAN to release the user plane connection between the RAN and the third core network entity.

In this embodiment of the present invention, optionally, before the transceiver unit 51 sends the third message to the first core network entity, the transceiver unit 51 is further configured to: receive a fifth message sent by the third core network entity, where the fifth message is used to indicate that the UE receives or sends no data within preset duration; or receive a sixth message sent by the UE, where the sixth message is used to request to enter the idle mode in the target network slice.

The core network entity 50 according to this embodiment of the present invention may correspond to the CP function in the methods according to the embodiments of the present invention. In addition, units and modules in the core network entity 50 and the foregoing and other operations and/or functions are respectively intended to implement corresponding procedures of the method 300 and the method 400. For brevity, details are not described herein.

The core network entity according to this embodiment of the present invention receives the message that is for requesting to change the mode of the user equipment UE to the connected mode and that is sent by a core network entity outside the network slice to which the core network entity belongs, and establishes a control plane connection to the UE based on the message, to enable the UE to enter the connected mode. In this way, it can be avoided that connection modes are difficult to manage because UE is in an idle mode in a network slice and is in a connected mode in another network slice, and network management efficiency can be improved.

Figure 16:
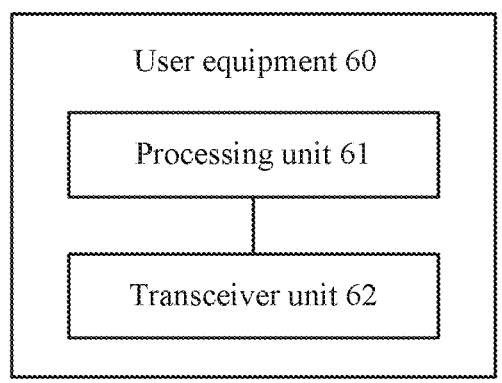
FIG. 16 is a schematic block diagram of user equipment according to another embodiment of the present invention.

FIG. 16 shows user equipment according to another embodiment of the present invention. The user equipment is applied to a communications system, and the communications system includes the user equipment, a radio access network RAN, a first core network entity, and at least one network slice. As shown in FIG. 16, the user equipment 60 includes:

a processing unit 61, configured to establish a signaling connection to the first core network entity; and a transceiver unit 62, configured to send a first message to the first core network entity, where the first message is used to request to enter a connected mode in a target network slice, the target network slice includes a second core network entity, and the user equipment performs non-access stratum NAS communication with the second core network entity by using the RAN and the first core network entity, so that the first core network entity sends, to the second core network entity based on the first message, a second message used to request to change a mode of the user equipment from an idle mode to the connected mode, so that the second core network entity establishes a NAS connection to the user equipment based on the second message, to enable the user equipment to enter the connected mode.

Therefore, the user equipment according to this embodiment of the present invention sends the message for requesting to enter the connected mode in the target network slice to the core network entity that has established a connection to the user equipment, so that the core network entity interacts with the core network entity in the target network slice based on the message, to change the mode of the user equipment to the connected mode. In this way, it can be avoided that connection modes are difficult to manage because UE is in an idle mode in a network slice and is in a connected mode in another network slice, and network management efficiency can be improved.

In this embodiment of the present invention, optionally, the transceiver unit 62 is further configured to receive a third message sent by the first core network entity, where the third message is used to notify that the user equipment has entered the connected mode in the target network slice.

The user equipment 60 according to this embodiment of the present invention may correspond to the user equipment in the methods according to the embodiments of the present invention. In addition, units and modules in the user equipment 60 and the foregoing and other operations and/or functions are respectively intended to implement corresponding procedures of the method 300 and the method 400. For brevity, details are not described herein.

Figure 17:
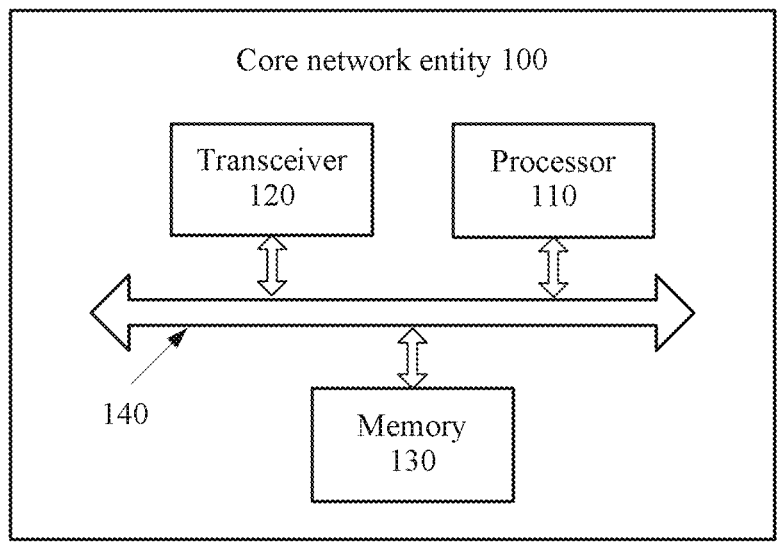
FIG. 17 is a schematic block diagram of a core network entity according to still another embodiment of the present invention.

FIG. 17 shows a schematic block diagram of a core network entity 100 according to an embodiment of the present invention. The core network entity is applied to a communications system, and the communications system includes user equipment UE, a radio access network RAN, the core network entity, and at least one network slice. As shown in FIG. 17, the core network entity 100 includes a processor 110 and a transceiver 120. The processor 110 is connected to the transceiver 120. Optionally, the core network entity 100 further includes a memory 130. The memory 130 is connected to the processor 110. Further, optionally, the core network entity 100 includes a bus system 140. The processor 110, the memory 130, and the transceiver 120 may be connected by using the bus system 140. The memory 130 may be configured to store an instruction. The processor 110 is configured to execute the instruction stored in the memory 130, so as to control the transceiver 120 to send information or a signal.

The processor 110 is configured to establish a signaling connection to the UE.

The transceiver 120 is configured to receive network slice information and a non-access stratum NAS message that are sent by the UE over the signaling connection.

The transceiver 120 is further configured to determine a target network slice from the at least one network slice based on the network slice information, where the target network slice includes a second core network entity, and the UE performs NAS communication with the second core network entity by using the RAN and the core network entity.

The transceiver is further configured to send the NAS message to the second core network entity.

Optionally, in an embodiment, the network slice information is a network slice identifier or a data transmission requirement that a network slice needs to support.

The processor 110 is specifically configured to: determine a network slice corresponding to the network slice identifier as the target network slice; or determine the network slice supporting the data transmission requirement as the target network slice.

Optionally, in an embodiment, the NAS message is an attach request message.

The transceiver 120 is specifically configured to send the attach request message and identification information of the core network entity to the second core network entity, so that after registering the UE with the target network slice based on the attach request message, the second core network entity sends the NAS message to the UE based on the identification information of the core network entity.

Optionally, in an embodiment, the target network slice further includes a third core network entity, and the UE performs data communication with the third core network entity by using the RAN.

After the transceiver 120 sends the attach request message and the identification information of the core network entity to the second core network entity, the transceiver 120 is further configured to: receive user plane information sent by the second core network entity, where the user plane information is used by the RAN to establish a user plane connection to the third core network entity; and send the user plane information to the RAN, so that the RAN establishes the user plane connection to the third core network entity based on the user plane information.

Optionally, in an embodiment, the transceiver 120 is further configured to send the network slice information to the RAN, so that the RAN stores a correspondence between a data radio bearer DRB between the RAN and the UE plus the network slice information, and the user plane connection between the RAN and the third core network entity.

Optionally, in an embodiment, the transceiver 120 is further configured to receive a first location update request message sent by the UE, where the first location update request message carries a temporary identity of the UE, the first location update request message is used to notify the core network entity of a location area in which the UE is currently located, and the temporary identity is allocated, to the UE, by a core network entity that serves the UE before the UE sends the first location update request message to the core network entity;

the processor 110 is further configured to determine, based on the temporary identity of the UE, a fourth core network entity in a network slice with which the UE currently registers; and the transceiver 120 is further configured to send the identification information of the core network entity to the fourth core network entity, so that the fourth core network entity sends the NAS message to the UE based on the identification information of the core network entity.

The core network entity 100 according to this embodiment of the present invention may correspond to the MMF in the methods according to the embodiments of the present invention. In addition, units and modules in the core network entity 100 and the foregoing and other operations and/or functions are respectively intended to implement corresponding procedures of the method 100 and the method 200. For brevity, details are not described herein.

The core network entity according to this embodiment of the present invention can forward NAS messages of the UE to core network entities in a plurality of network slices, and the UE does not need to establish a signaling connection to a core network entity in each network slice to transmit the NAS message, so that an amount of signaling in a communication process can be reduced, and network management and maintenance efficiency can be improved.

Alternatively, the processor 110 is configured to determine that the UE needs to change from an idle mode to a connected mode in a target network slice in the at least one network slice, where the target network slice includes a second core network entity, and the UE performs non-access stratum NAS communication with the second core network entity by using the RAN and the core network entity; and the transceiver 120 is configured to send a first message to the second core network entity, where the first message is used to request to change a mode of the UE from the idle mode to the connected mode, so that the second core network entity establishes a NAS connection to the UE based on the first message, to enable the UE to enter the connected mode.

Optionally, in an embodiment, the target network slice further includes a third core network entity, and the UE performs data communication with the third core network entity by using the RAN.

After the transceiver 120 sends the first message to the second core network entity, the transceiver 120 is further configured to: receive user plane information sent by the second core network entity, where the user plane information is used by the RAN to establish a user plane connection to the third core network entity; and send the user plane information to the RAN, so that the target RAN establishes the user plane connection to the third core network entity based on the user plane information.

Optionally, in an embodiment, the transceiver 120 is further configured to receive a second message sent by the UE, where the second message includes network slice information, and the second message is used by the UE to request to enter the connected mode in a network slice indicated by the network slice information; and the processor 110 is specifically configured to determine, based on the second message, that the UE needs to change from the idle mode to the connected mode in the network slice indicated by the network slice information.

Optionally, in an embodiment, the transceiver 120 is further configured to receive a third message sent by the second core network entity, where the third message is used to indicate that the second core network entity has data to be sent to the UE, or the third message is used to indicate that the second core network entity needs to perform NAS communication with the UE;

the processor 110 is specifically configured to determine, based on the third message, that the UE needs to change from the idle mode to the connected mode in the target network slice; and the transceiver 120 is specifically configured to send the first message to the second core network entity if the processor 110 determines that a signaling connection is established between the core network entity and the UE.

Optionally, in an embodiment, the transceiver 120 is further configured to: send a paging message to the UE if the processor 110 determines that no signaling connection is established between the core network entity and the UE; receive a fourth message sent by the UE based on the paging message, where the fourth message is used to request to establish a signaling connection to the core network entity; establish the signaling connection to the UE based on the fourth message; and send the first message to the second core network entity after the signaling connection to the UE is established.

Optionally, the transceiver 120 is further configured to receive a fifth message sent by the second core network entity, where the fifth message is used to instruct the core network entity to send a sixth message to the RAN, and the sixth message is used to instruct the RAN to release the user plane connection between the RAN and the third core network entity.

Optionally, after the transceiver 120 receives the fifth message sent by the second core network entity, if the transceiver 120 determines that the UE is in the connected mode in only the target network slice, the sixth message includes connection release information used to instruct the RAN to release a control plane connection and a user plane connection between the RAN and the UE.

Optionally, the transceiver 120 is further configured to send a seventh message to the UE, where the seventh message is used to notify that the UE has entered the connected mode in the target network slice.

The core network entity 100 according to this embodiment of the present invention may correspond to the MMF in the methods according to the embodiments of the present invention. In addition, units and modules in the core network entity 100 and the foregoing and other operations and/or functions are respectively intended to implement corresponding procedures of the method 300 and the method 400. For brevity, details are not described herein.

When determining that the UE needs to change from the idle mode to the connected mode in the target network slice, the core network entity according to this embodiment of the present invention sends the message for requesting to change the mode of the UE to the connected mode to the second core network entity in the target network slice, so that the second core network entity can establish the control plane connection to the UE based on the message sent by the core network entity, to enable the UE to enter the connected mode. In this way, it can be avoided that connection modes are difficult to manage because UE is in an idle mode in a network slice and is in a connected mode in another network slice, and network management efficiency can be improved.

Figure 18:
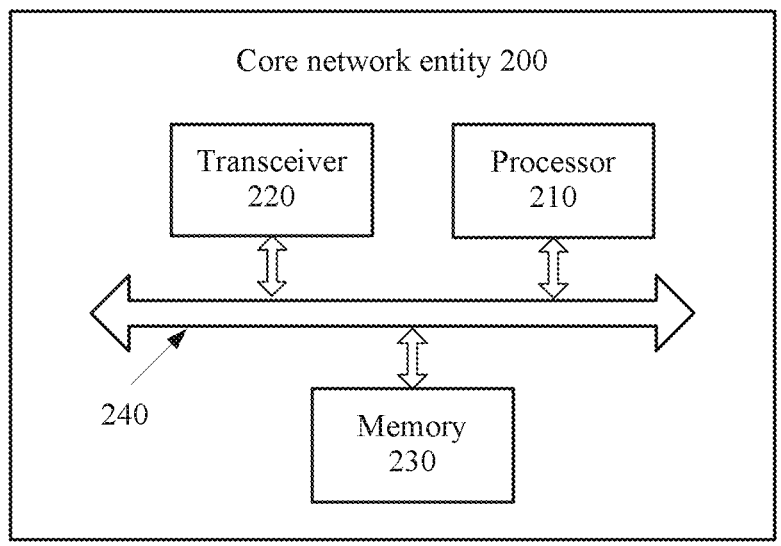
FIG. 18 is a schematic block diagram of a core network entity according to still another embodiment of the present invention.

FIG. 18 shows a schematic block diagram of a core network entity 200 according to still another embodiment of the present invention. The core network entity is applied to a communications system. The communications system includes user equipment UE, a radio access network RAN, a first core network entity, and at least one network slice. A target network slice in the at least one network slice includes the core network entity. The UE performs non-access stratum NAS communication with the core network entity by using the RAN and the first core network entity. As shown in FIG. 18, the core network entity 200 includes a processor 210 and a transceiver 220. The processor 210 is connected to the transceiver 220. Optionally, the core network entity 200 further includes a memory 230. The memory 230 is connected to the processor 210. Further, optionally, the core network entity 200 includes a bus system 240. The processor 210, the memory 230, and the transceiver 220 may be connected by using the bus system 240. The memory 230 may be configured to store an instruction. The processor 210 is configured to execute the instruction stored in the memory 230, so as to control the transceiver 220 to send information or a signal.

The transceiver 220 is configured to receive a NAS message sent by the first core network entity, where the target network slice is determined by the first core network entity based on network slice information sent by the UE, and the NAS message is sent by the UE to the first core network entity.

The processor 210 is configured to perform NAS communication with the UE based on the NAS message.

Optionally, in an embodiment, the NAS message is an attach request message.

The transceiver 220 is specifically configured to receive the attach request message and identification information of the first core network entity that are sent by the first core network entity.

The processor 210 is specifically configured to register the UE with the target network slice based on the attach request message; and the transceiver 220 is specifically configured to send a NAS message to the UE based on the identification information of the first core network entity.

Optionally, in an embodiment, the target network slice further includes a third core network entity, and the UE performs data communication with the third core network entity by using the RAN.

After the transceiver 220 receives the attach request message and the identification information of the first core network entity that are sent by the first core network entity, the transceiver 220 is further configured to send user plane information to the first core network entity, where the user plane information is used by the RAN to establish a user plane connection to the third core network entity, so that the first core network entity sends the user plane information to the RAN, and the RAN establishes the user plane connection to the third core network entity based on the user plane information.

The core network entity 200 according to this embodiment of the present invention may correspond to the CP function in the methods according to the embodiments of the present invention. In addition, units and modules in the core network entity 200 and the foregoing and other operations and/or functions are respectively intended to implement corresponding procedures of the method 100 and the method 200. For brevity, details are not described herein.

The core network entity according to this embodiment of the present invention can receive the NAS message of the UE that is forwarded by a core network entity outside the network slice, and the UE does not need to establish a signaling connection to a core network entity in each network slice to transmit the NAS message, so that an amount of signaling in a communication process can be reduced, and network management and maintenance efficiency can be improved.

Alternatively, the transceiver 220 is configured to send a first message to the first core network entity, where the first message is used to indicate that the core network entity has data to be sent to the UE, or the first message is used to indicate that the core network entity needs to perform NAS communication with the UE, so that the first core network entity determines, based on the first message, that the UE needs to change from an idle mode to a connected mode in the target network slice.

The transceiver 220 is further configured to receive a second message sent by the first core network entity, where the second message is used to request to change a mode of the UE from the idle mode to the connected mode.

The processor 210 is configured to establish a NAS connection to the UE based on the second message, to enable the UE to enter the connected mode.

Optionally, in an embodiment, the target network slice further includes a third core network entity, and the UE performs data communication with the third core network entity by using the RAN.

After the transceiver 220 receives the second message sent by the first core network entity, the transceiver 220 is further configured to send user plane information to the first core network entity, where the user plane information is used by the RAN to establish a user plane connection to the third core network entity, so that the first core network entity sends the user plane information to the RAN, and the RAN establishes the user plane connection to the third core network entity based on the user plane information.

Optionally, in an embodiment, the transceiver 220 is further configured to send a third message to the first core network entity, where the third message is used to instruct the first core network entity to send a fourth message to the RAN, and the fourth message is used to instruct the RAN to release the user plane connection between the RAN and the third core network entity.

Optionally, in an embodiment, before the transceiver 220 sends the third message to the first core network entity, the transceiver 220 is further configured to: receive a fifth message sent by the third core network entity, where the fifth message is used to indicate that the UE receives or sends no data within preset duration; or receive a sixth message sent by the UE, where the sixth message is used to request to enter the idle mode in the target network slice.

The core network entity 200 according to this embodiment of the present invention may correspond to the CP function in the methods according to the embodiments of the present invention. In addition, units and modules in the core network entity 200 and the foregoing and other operations and/or functions are respectively intended to implement corresponding procedures of the method 300 and the method 400. For brevity, details are not described herein.

The core network entity according to this embodiment of the present invention receives the message that is for requesting to change the mode of the user equipment UE to the connected mode and that is sent by a core network entity outside the network slice to which the core network entity belongs, and establishes a control plane connection to the UE based on the message, to enable the UE to enter the connected mode. In this way, it can be avoided that connection modes are difficult to manage because UE is in an idle mode in a network slice and is in a connected mode in another network slice, and network management efficiency can be improved.

Figure 19:
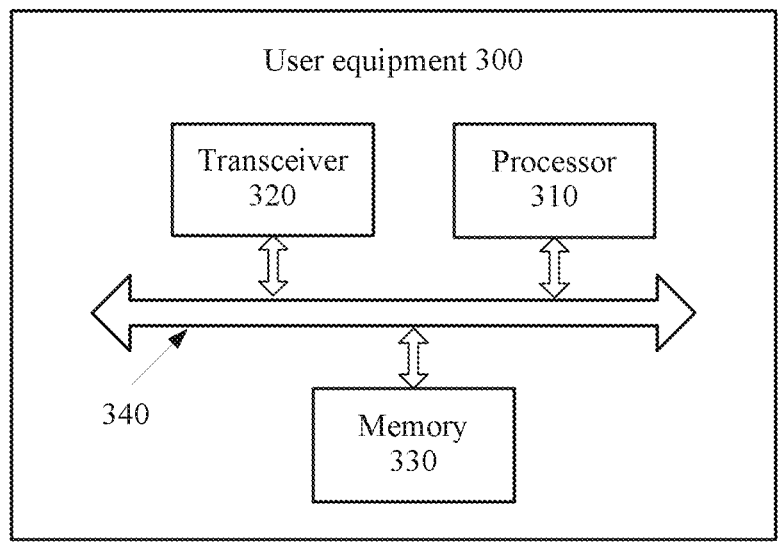
FIG. 19 is a schematic block diagram of user equipment according to still another embodiment of the present invention.

FIG. 19 shows a schematic block diagram of user equipment 300 according to still another embodiment of the present invention. The user equipment is applied to a communications system, and the communications system includes the user equipment, a radio access network RAN, a first core network entity, and at least one network slice. As shown in FIG. 19, the user equipment 300 includes a processor 310 and a transceiver 320. The processor 310 is connected to the transceiver 320. Optionally, the user equipment 300 further includes a memory 330. The memory 330 is connected to the processor 310. Further, optionally, the user equipment 300 includes a bus system 340. The processor 310, the memory 330, and the transceiver 320 may be connected by using the bus system 340. The memory 330 may be configured to store an instruction. The processor 310 is configured to execute the instruction stored in the memory 330, so as to control the transceiver 320 to send information or a signal.

The processor 310 is configured to establish a signaling connection to the first core network entity.

The transceiver 320 is configured to send network slice information and a non-access stratum NAS message to the first core network entity, so that the first core network entity determines a target network slice from the at least one network slice based on the network slice information, and sends the NAS message to a second core network entity in the target network slice, where the user equipment performs NAS communication with the second core network entity by using the RAN and the first core network entity.

Optionally, in an embodiment, the network slice information is a network slice identifier or a data transmission requirement that a network slice needs to support.

Optionally, in an embodiment, the NAS message is an attach request message.

The user equipment 300 according to this embodiment of the present invention may correspond to the user equipment in the methods according to the embodiments of the present invention. In addition, units and modules in the user equipment 300 and the foregoing and other operations and/or functions are respectively intended to implement corresponding procedures of the method 100 and the method 200. For brevity, details are not described herein.

The user equipment according to this embodiment sends the network slice information and the NAS message to the core network entity that has established a connection to the UE, so that the core network entity determines, based on the network slice information sent by the user equipment, the target network slice that serves the UE, and sends the NAS message to the core network entity in the target network slice. In this way, one core network entity can forward NAS messages of the UE to core network entities of a plurality of network slices, and the UE does not need to establish a signaling connection to a core network entity in each network slice to transmit the NAS message, so that an amount of signaling in a communication process can be reduced, and network management and maintenance efficiency can be improved.

Alternatively, the processor 310 is configured to establish a signaling connection to the first core network entity.

The transceiver 320 is configured to send a first message to the first core network entity, where the first message is used to request to enter a connected mode in a target network slice, the target network slice includes a second core network entity, and the user equipment performs non-access stratum NAS communication with the second core network entity by using the RAN and the first core network entity, so that the first core network entity sends, to the second core network entity based on the first message, a second message used to request to change a mode of the user equipment from an idle mode to the connected mode, so that the second core network entity establishes a NAS connection to the user equipment based on the second message, to enable the user equipment to enter the connected mode.

Optionally, in an embodiment, the transceiver 320 is further configured to receive a third message sent by the first core network entity, where the third message is used to notify that the user equipment has entered the connected mode in the target network slice.

The user equipment 300 according to this embodiment of the present invention may correspond to the user equipment in the methods according to the embodiments of the present invention. In addition, units and modules in the user equipment 300 and the foregoing and other operations and/or functions are respectively intended to implement corresponding procedures of the method 300 and the method 400. For brevity, details are not described herein.

The user equipment according to this embodiment of the present invention sends the message for requesting to enter the connected mode in the target network slice to the core network entity that has established a connection to the user equipment, so that the core network entity interacts with the core network entity in the target network slice based on the message, to change the mode of the user equipment to the connected mode. In this way, it can be avoided that connection modes are difficult to manage because UE is in an idle mode in a network slice and is in a connected mode in another network slice, and network management efficiency can be improved.

Figure 20:
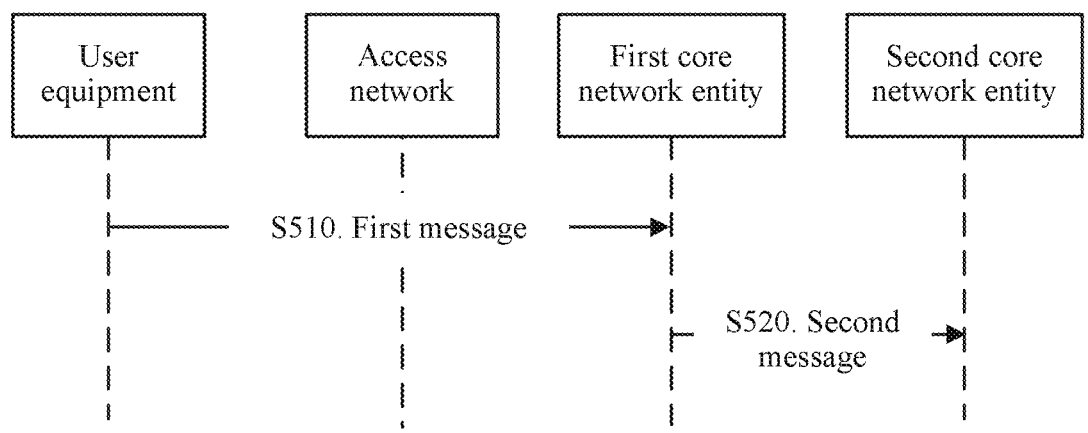
FIG. 20 is a schematic flowchart of a wireless communication method according to another embodiment of the present invention.

FIG. 20 shows a wireless communication method according to another embodiment of the present invention. The method is applied to a wireless communications system, and the wireless communications system includes user equipment UE, an access network AN, a first core network entity, and at least one network slice. As shown in FIG. 20, the method 500 includes:

S510. The first core network entity receives a first message sent by the UE, where the first message includes first information used by the first core network entity to determine a target network slice, the first message is used to request to activate a session of the UE in the target network slice, and the target network slice includes a second core network entity.

It can be understood that the target network slice is a network slice in the at least one network slice.

S520. The first core network entity sends a second message to the second core network entity, where the second message is used to request to activate the session of the UE, so that the second core network entity activates a user plane connection of the UE based on the second message.

Therefore, according to the wireless communications method in this embodiment of the present invention, after receiving the request for requesting to activate the session in the target network slice that is sent by the UE, the first core network entity sends, to the second core network entity in the target network slice, the message for requesting to activate the session of the UE, so that the second core network entity can activate the user plane connection of the UE based on the message sent by the first core network entity, to enable the UE to enter a connected mode in the target network slice. In this way, it can be avoided that connection modes are difficult to manage because UE is in an idle mode in a network slice and is in a connected mode in another network slice, and network management efficiency can be improved. The session herein is an abbreviation for a PDU (Packet Data Unit, protocol data unit) session. A PDU session is an association relationship between the UE and a data network (data network) that provides a PDU connection service. The UE communicates with the data network by using the PDU session.

It should be noted that, in this embodiment of the present invention, the access network AN includes a radio access network RAN and Wireless Fidelity (Wireless Fidelity, "WiFi" for short). However, the present invention is not limited thereto.

In this embodiment of the present invention, optionally, the target network slice further includes a third core network entity, and the UE performs data communication with the third core network entity by using the AN. Before the first core network entity sends the second message to the second core network entity, the first core network entity receives user plane information sent by the second core network entity, where the user plane information is used by the AN to establish a user plane connection to the third core network entity; and the first core network entity sends the user plane information to the AN, so that the AN establishes the user plane connection to the third core network entity based on the user plane information.

In this embodiment of the present invention, optionally, the first information includes an identifier of the target network slice, or the first information includes a type of the target network slice, or the first information includes a type and a tenant identity (Tenant ID) of the target network slice. The type of the target network slice may be a type of a service that the target network slice supports, for example, MBB, and low delay and high reliability.

In this embodiment of the present invention, optionally, the first information includes an identifier allocated by the second core network entity to the UE. When the first core network entity sends the second message to the second core network entity, the first core network entity determines the second core network entity based on the identifier allocated by the second core network entity to the UE, and then sends the second message to the second core network entity. The second message includes the identifier allocated by the second core network entity to the UE.

In this embodiment of the present invention, optionally, the first message further includes session information, and the second message includes the session information. Therefore, the second core network entity activates, based on the second message, the user plane connection indicated by the session information. That the second core network entity activates, based on the second message, the user plane connection indicated by the session information is specifically: the second core network entity obtains context information of the user plane connection corresponding to the session information, and sends a user plane connection activation request message to an AN and a gateway that are corresponding to the session, so as to activate the user plane connection between the AN and the gateway. The AN sends a request message to the UE based on the request from the second core network entity, so as to activate a user plane connection between the UE and the AN.

In this embodiment of the present invention, optionally, after the second core network entity activates the user plane connection of the UE, the first core network entity sends a third message to the UE, where the third message includes information used to indicate a session in an active state in the target network slice, so that the UE learns that a session corresponding to the session information is activated. Correspondingly, a TFT (Traffic Flow Template, traffic flow template) corresponding to the session is activated. Alternatively, the third message includes the identifier of the target network slice, so that the UE learns that all sessions corresponding to the target network slice are activated.

Figure 21:
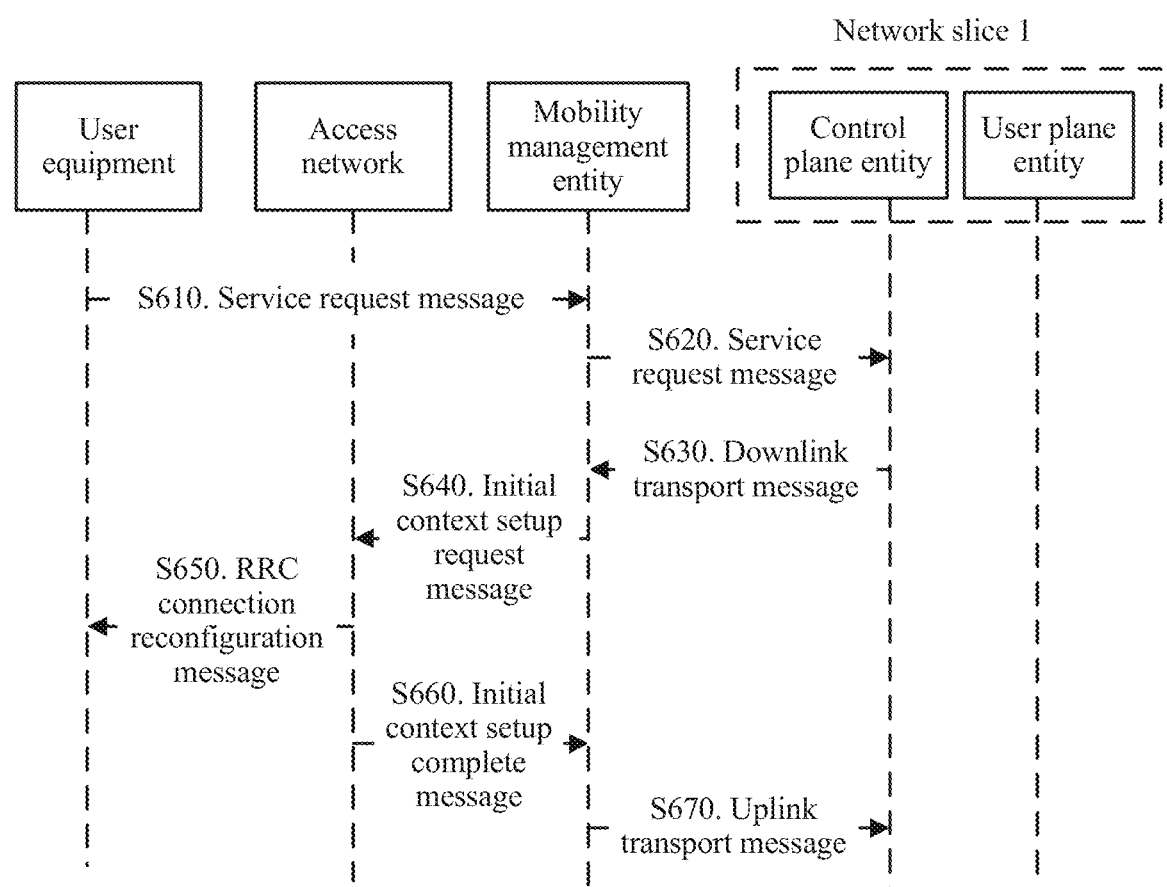
FIG. 21 is a schematic flowchart of a wireless communication method according to a specific embodiment of the present invention.

FIG. 21 shows a wireless communication method according to a specific embodiment of the present invention. As shown in FIG. 21, the method 600 includes the following steps.

S610. UE sends a service request (Service Request) message to an MMF.

The service request message is used to request to activate a session of the UE (or this may be understood as that the service request message is used to request to enter a connected mode). The service request message includes UE info and network slice info. The UE info is a temporary identity (ID) allocated by the MMF to the UE, or a temporary identity allocated by a CP function to the UE. The network slice info is a network slice identifier. The network slice ID may be an independent field, or may include two fields, for example, a type (type) ID+a tenant (Tenant) ID. The network slice ID may also be included in the temporary identity of the UE.

Optionally, the service request message further carries an identifier of a PDU session.

Optionally, if the service request message does not carry an identifier of a PDU session, the service request message carries information used to indicate whether to restore a data connection.

Optionally, if the service request message carries no network slice ID, the message carries an identifier allocated by the CP function to the UE. The identifier allocated by the CP function to the UE includes network slice information, CP function information, and UE information.

The service request message herein is merely a possible message, and another message, such as a service active request (Service Active Request) message may also be possible.

S620. The MMF sends the service request (Service Request) message to a CP function.

The MMF learns of, based on the network slice info, a connection of a network slice that the UE requests to restore, which is specifically a PDU session of a network slice that the UE requests to restore. The service request message is used to request to activate the session of the UE (or this may be understood as that the service request message is used to request to restore the UE to the connected mode in the network slice).

Optionally, if the service request message in S610 carries a PDU session ID, the service request message in S620 carries the PDU session ID, and the CP function restores only a PDU session corresponding to the PDU session ID. However, if the service request message in S610 carries no PDU session ID, the service request message in S620 carries no PDU session ID either, and in this case, the CP function restores all PDU sessions in a network slice corresponding to the network slice info.

Optionally, if the service request message in S610 carries no PDU session ID, but the service request message in S610 carries information used to indicate whether to restore a data connection, the CP function restores all PDU sessions in a network slice corresponding to the network slice info.

S630. The CP function sends a downlink transport (Downlink Transport) message to the MMF.

The downlink transport message includes a NAS container and an RAN container. The NAS container includes a NAS message to be sent to the UE. The NAS message may be specifically a PDU session ID used to notify the UE of a PDU session that has been restored in the network slice corresponding to the network slice info. The NAS message may further carry the network slice ID. The AN container carries information related to a user plane connection. The information related to a user plane connection includes an IP address of a UP function that establishes a user plane connection to the CP function and/or a tunnel ID allocated by the UP function to the UE, so that an AN establishes a user plane connection to the UP function based on the information related to a user plane connection. The MMF does not parse or cannot parse content in the RAN container.

S640. The MMF sends an Initial Context Setup Request (Initial Context Setup Request) message to an AN.

The Initial Context Setup Request message includes the NAS container and the RAN container that are received in S630. The Initial Context Setup Request message may further carry the UE info and the PDU session ID, or may further carry the network slice ID. The network slice ID may be an independent identifier, or may be carried in the UE info and be a part of the UE info, or may be a part of the PDU session ID. The network slice ID is used by the RAN to record a correspondence between an identifier of a user plane bearer between the UE and the RAN plus a PDU session ID' corresponding to the PDU session ID, and an identifier of the connection between the AN and the UP function. Specifically, the following relationship may be recorded: the identifier of the user plane bearer between the UE and the AN+the PDU session ID'⇔the connection identifier of the connection between the AN and the UP function. Alternatively, the network slice ID may be used by the AN to record a correspondence between an identifier of a user plane bearer between the UE and the AN plus a PDU session ID' corresponding to the PDU session ID and a network slice ID' corresponding to the network slice ID, and an identifier of the connection between the AN and the UP function. Specifically, the following relationship may be recorded: the identifier of the user plane bearer between the UE and the AN+the PDU session ID'+the network slice ID'⇔the connection identifier of the connection between the AN and the UP function.

The connection identifier of the connection between the AN and the UP function may be the PDU session ID. The PDU session ID' may be an identifier that is corresponding to the PDU session ID and that is allocated by the AN to the UE. The network slice ID' may be an identifier that is corresponding to the network slice ID and that is allocated by the AN to the UE.

S650. The AN sends an RRC connection reconfiguration message to the UE.

The RRC connection reconfiguration message sent by the RAN to the UE includes the AS container, received in S640, that is sent by the MMF. The UE performs RRC connection reconfiguration after receiving the RRC connection reconfiguration message, and returns an RRC reconfiguration complete message to the RAN after completing the RRC connection reconfiguration. In addition, the UE records a correspondence between the connection identifier of the user plane connection between the UE and the AN plus the PDU session ID' corresponding to the PDU session ID, and the PDU session ID. Specifically, the following relationship may be recorded: the connection identifier of the user plane connection between the UE and the AN+the PDU session ID'⇔the PDU session ID. Alternatively, the UE records a correspondence between the connection identifier of the user plane connection between the UE and the AN plus the PDU session ID' corresponding to the PDU session ID and the network slice ID' corresponding to the network slice ID, and the PDU session ID plus the network slice ID. Specifically, the following relationship may be recorded: the connection identifier of the user plane connection between the UE and the AN+the PDU session ID'+the network slice ID'⇔the PDU session ID+the network slice ID. The UE determines, based on the AN container or the PDU session ID in the AN container, that the corresponding PDU session has been restored, and an IP address and a traffic flow template (Traffic Flow Template, "TFT" for short) corresponding to the PDU session ID can be used.

S660. The AN sends an Initial Context Setup Response message to the MMF.

The Initial Context Setup Response message includes an AN container and the UE info. The AN container includes information related to the user plane connection established on the AN side. The information related to the user plane connection established on the AN side includes an identifier of the AN and/or the user plane tunnel ID. The MMF does not parse or cannot parse content in the AN container sent by the AN.

S670. The MMF sends an uplink transport message to the CP function.

The uplink transport message includes the UE info and the AN container, received in S660, that is sent by the AN.

It may be understood that the UE may send data after S660. Specifically, the UE receives an IP packet at an application layer, and the UE determines, based on the TFT, a PDU session in a network slice required for sending the IP packet. The UE obtains the connection identifier of the user plane connection between the UE and the AN and the PDU session ID' based on the PDU session and the correspondence stored in S650. Optionally, the UE may further obtain the network slice ID'. Then, the UE sends a data packet to the AN by using the user plane connection corresponding to the connection identifier of the user plane connection between the UE and the AN. The data packet includes the PDU session ID'. Optionally, the data packet includes the network slice ID'. After receiving the data packet, the AN determines the UP function corresponding to the PDU session ID in the corresponding network slice based on the stored correspondence and the PDU session ID', and sends the data packet to the determined UP function. Optionally, the AN may also determine the UP function based on the network slice ID'.

Figure 22:
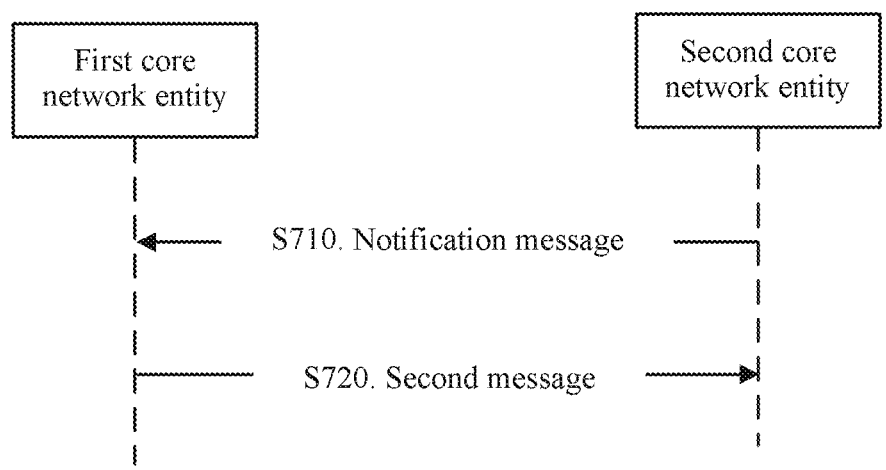
FIG. 22 is a schematic flowchart of a wireless communication method according to still another embodiment of the present invention.

With reference to FIG. 22, a wireless communication method according to still another embodiment of the present invention is described in detail in the following. The method is applied to a wireless communications system, and the wireless communications system includes user equipment UE, an access network AN, a first core network entity, and at least one network slice. As shown in FIG. 22, the method 700 includes:

S710. The first core network entity receives a notification message sent by a second core network entity in a target network slice, where the notification message is used to indicate that the second core network entity has downlink data to be sent to the UE, or the notification message is used to indicate that the second core network entity needs to perform non-access stratum NAS communication with the UE.

S720. The first core network entity sends a second message to the second core network entity, where the second message is used to request to activate a session of the UE, so that the second core network entity activates a user plane connection of the UE based on the second message.

Therefore, according to the wireless communications method in this embodiment of the present invention, when receiving the notification message sent by the second core network entity, the first core network entity sends, to the second core network entity in the target network slice, the message for requesting to activate the session of the UE, so that the second core network entity can activate the user plane connection of the UE based on the message sent by the first core network entity, to enable the UE to enter a connected mode. In this way, it can be avoided that connection modes are difficult to manage because UE is in an idle mode in a network slice and is in a connected mode in another network slice, and network management efficiency can be improved.

In this embodiment of the present invention, optionally, the target network slice further includes a third core network entity, and the UE performs data communication with the third core network entity by using the AN. After the first core network entity sends the second message to the second core network entity, the first core network entity receives user plane information sent by the second core network entity, where the user plane information is used by the AN to establish a user plane connection to the third core network entity; and the first core network entity sends the user plane information to the AN, so that the AN establishes the user plane connection to the third core network entity based on the user plane information.

In this embodiment of the present invention, optionally, the sending, by the first core network entity, a second message to the second core network entity includes: sending, by the first core network entity, the second message to the second core network entity when the first core network entity determines that the first core network entity is in signaling connection to the UE or has an active session corresponding to the UE.

In this embodiment of the present invention, optionally, before the sending, by the first core network entity, a second message to the second core network entity, the method further includes: sending, by the first core network entity, a paging message to the UE when the first core network entity determines that the first core network entity is not in signaling connection to the UE or has no active session corresponding to the UE, where the paging message includes second information used by the UE to determine the target network slice; and receiving, by the first core network entity, a first message sent by the UE based on the paging message, where the first message includes first information used by the first core network entity to determine the target network slice.

In this embodiment of the present invention, optionally, the second information includes an identifier of the target network slice, or the second information includes a type of the target network slice, or the second information includes a type and a tenant identity of the target network slice, or the second information includes an identifier allocated by the second core network entity to the UE.

In this embodiment of the present invention, optionally, the first information includes an identifier of the target network slice.

In this embodiment of the present invention, optionally, the first information includes an identifier of the second core network entity, and the identifier of the second core network entity includes an identifier of the target network slice.

In this embodiment of the present invention, optionally, the first information includes information about the second core network entity, and the method further includes: determining, by the first core network entity, an identifier of the target network slice based on the information about the second core network entity and a preset correspondence, where the preset correspondence includes a correspondence between the information about the second core network entity and an identifier of a network slice.

In this embodiment of the present invention, optionally, the method further includes: sending, by the first core network entity, a third message to the UE, where the third message includes the identifier of the target network slice; or sending, by the first core network entity, a third message to the UE, where the third message includes information used to indicate a session in an active state in the target network slice.

Figure 23:
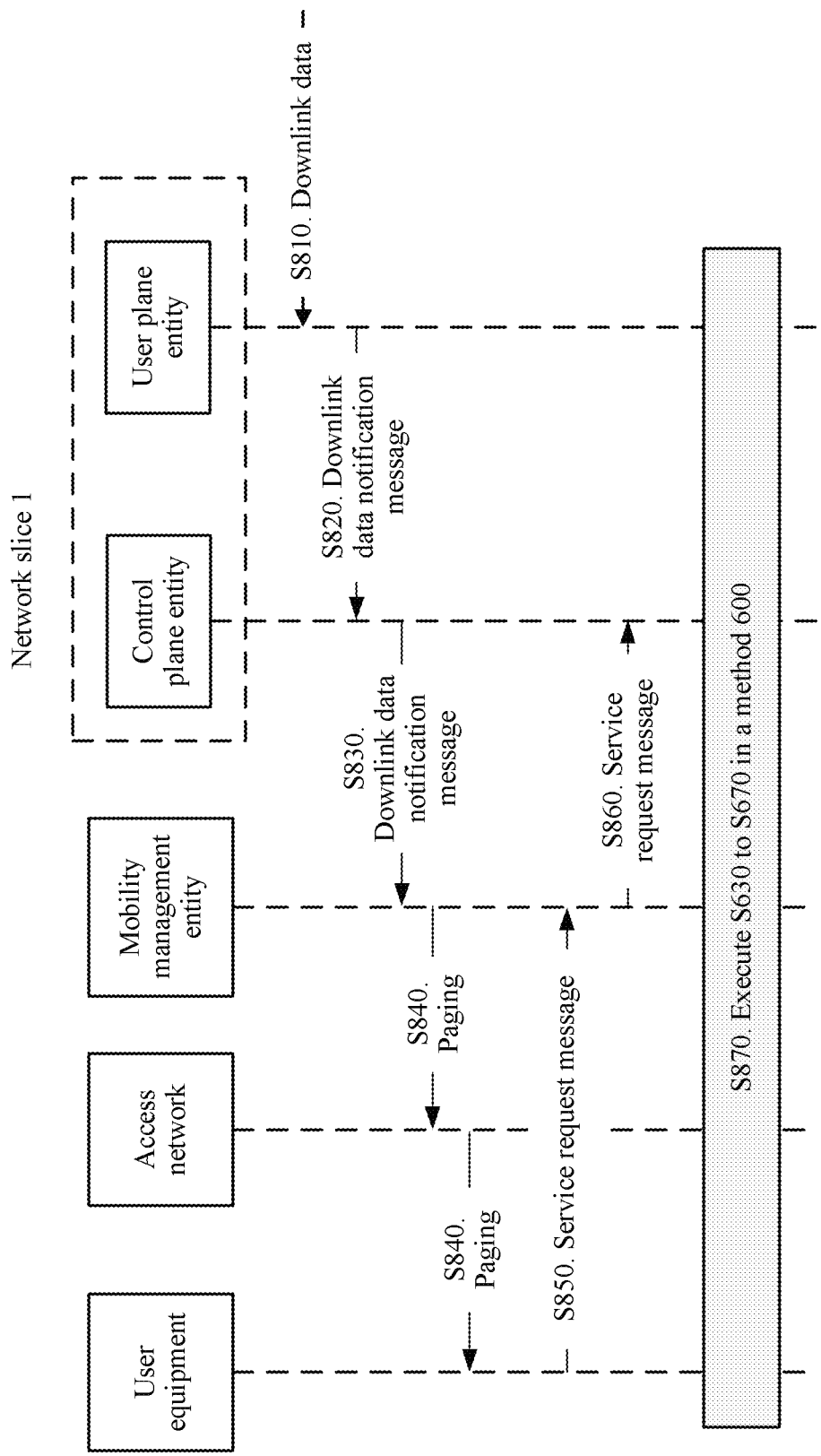
FIG. 23 is a schematic flowchart of a wireless communication method according to another specific embodiment of the present invention.

FIG. 23 shows a wireless communication method according to another specific embodiment of the present invention. As shown in FIG. 23, the method 800 includes the following steps.

S810. A UP function receives downlink data.

S820. The UP function sends a downlink data notification (Downlink Data Notification) message to a CP function.

The downlink data notification message is used to notify the CP function that the UP function in a network slice 1 in which the CP function is located receives the downlink data that is sent by a network and whose destination IP address is an IP address of UE, but there is no user plane connection used for transmitting the downlink data to the UE.

Optionally, the downlink data notification message carries a PDU session ID of a PDU session corresponding to the downlink data.

S830. The CP function sends the downlink data notification message to an MMF.

Optionally, the downlink data notification message carries the PDU session ID of the PDU session corresponding to the downlink data.

S840: The MMF sends a paging message to UE.

The paging message carries an ID of a network slice in which a PDU session needs to be restored.

Optionally, the paging message carries the PDU session ID of the PDU session corresponding to the downlink data.

S850. An AN sends a service request message to the MMF.

It should be noted that a specific implementation of S850 is the same as that of S610 in the method 600. To avoid repetition, details are not described herein again.

S860. Execute S630 to S670 in the method 600.

Figure 24:
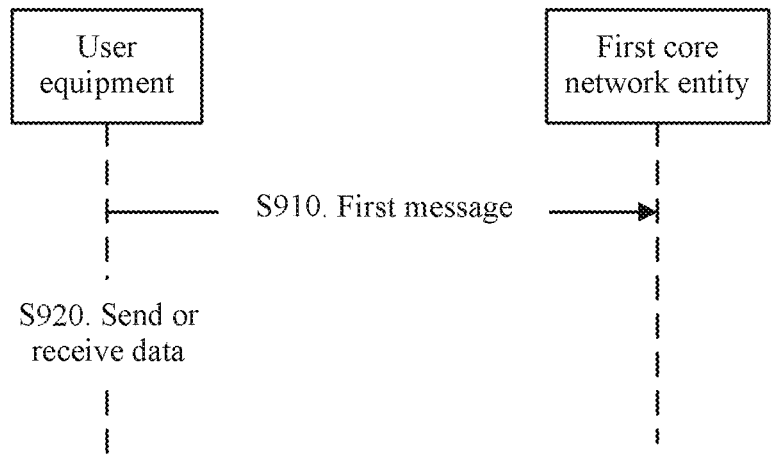
FIG. 24 is a schematic flowchart of a wireless communication method according to yet another embodiment of the present invention.

With reference to FIG. 20 to FIG. 23, the wireless communication method according to the embodiments of the present invention is described above in detail from the core network entity side. With reference to FIG. 24, the wireless communication method according to the embodiments of the present invention is described in detail in the following from a user equipment side.

FIG. 24 shows a wireless communication method according to yet another embodiment of the present invention. The method is applied to a communications system, and the communications system includes user equipment UE, an access network AN, a first core network entity, and at least one network slice. As shown in FIG. 24, the method 900 includes:

S910. The UE sends a first message to the first core network entity, where the first message includes first information used by the first core network entity to determine a target network slice, and the target network slice includes a second core network entity, so that the first core network entity sends, to the second core network entity based on the first message, a second message used to request to activate a session of the UE in the target network slice, and the second core network entity activates a user plane connection of the UE based on the second message.

S920. The UE sends or receives data by using the activated user plane connection.

Therefore, according to the wireless communications method in this embodiment of the present invention, the UE sends the request for requesting to activate the session in the target network slice to the first core network entity, so that when receiving the request from the UE, the first core network entity sends, to the second core network entity in the target network slice, the message for requesting to activate the session of the UE, so that the second core network entity can activate the user plane connection of the UE based on the message sent by the first core network entity, to enable the UE to enter a connected mode. In this way, it can be avoided that connection modes are difficult to manage because UE is in an idle mode in a network slice and is in a connected mode in another network slice, and network management efficiency can be improved.

In this embodiment of the present invention, optionally, before the sending, by the UE, a first message to the first core network entity, the method further includes: receiving, by the UE, a paging message sent by the first core network entity, where the paging message includes second information used by the UE to determine the target network slice.

In this embodiment of the present invention, optionally, before the sending, by the UE, a first message to the first core network entity, the method further includes: determining, by the UE, the second information based on the second message and a correspondence between information used by the UE to determine a network slice and information used by the first core network entity to determine the network slice.

In this embodiment of the present invention, optionally, the first information includes an identifier of the target network slice, or the first information includes a type of the target network slice, or the first information includes a type and a tenant identity of the target network slice.

In this embodiment of the present invention, optionally, the second information includes an identifier of the target network slice, or the second information includes a type of the target network slice, or the second information includes a type and a tenant identity of the target network slice, or the second information includes an identifier allocated by the second core network entity to the UE.

In this embodiment of the present invention, optionally, the first information includes an identifier of the target network slice; or the first information includes an identifier of the second core network entity, and the identifier of the second core network entity includes an identifier of the target network slice; or the first information includes information about the second core network entity, and there is a correspondence between an identifier of the second core network entity and an identifier of a network slice.

In this embodiment of the present invention, optionally, the method further includes: receiving, by the UE, a third message sent by the first core network entity, where the third message includes the identifier of the target network slice, and determining, by the UE, the activated session based on the identifier of the target network slice; or receiving, by the UE, a third message sent by the first core network entity, where the third message includes information used to indicate a session in an active state in the target network slice, and determining, by the UE, the activated session based on the information used to indicate the session in the active state in the target network slice.

In this embodiment of the present invention, optionally, the method further includes: receiving, by the UE, a fourth message sent by the AN, where the fourth message includes an identifier of a user plane connection between the UE and the AN and an identifier used to indicate a first session in the activated session, so that the UE stores a first correspondence between the identifier of the user plane connection between the UE and the AN plus the identifier used to indicate the first session, and an identifier of the first session.

In this embodiment of the present invention, optionally, the method further includes: receiving, by the UE, a fifth message sent by the AN, where the fifth message includes an identifier of a user plane connection between the UE and the AN, an identifier used to indicate a first session in the activated session, and information used to indicate the target network slice, so that the UE stores a second correspondence between the identifier used to indicate the first session plus the information used to indicate the target network slice, and an identifier of the first session plus the identifier of the target network slice.

In this embodiment of the present invention, optionally, the method further includes: determining, by the UE, to use the first session to send data to the AN; and sending, by the UE, a protocol data unit PDU including the data packet to the AN by using the user plane connection corresponding to the identifier of the user plane connection between the UE and the AN based on the identifier of the first session and the first correspondence, where the PDU includes the identifier used to indicate the first session.

In this embodiment of the present invention, optionally, the method further includes: determining, by the UE, to use the first session in the target network slice to send data to the AN; and sending, by the UE, a protocol data unit PDU including the data packet to the AN by using the user plane connection corresponding to the identifier of the user plane connection between the UE and the AN based on the identifier of the first session, the identifier of the target network slice, and the second correspondence, where the PDU includes the identifier used to indicate the first session and the information used to indicate the target network slice.

Figure 25:
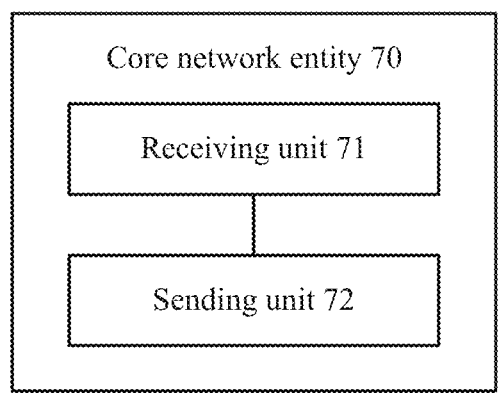
FIG. 25 is a schematic block diagram of a core network entity according to still another embodiment of the present invention.

With reference to FIG. 25, a core network entity according to an embodiment of the present invention is described in detail in the following. The core network entity is applied to a communications system, and the communications system includes user equipment UE, an access network AN, the core network entity, and at least one network slice. As shown in FIG. 25, the core network entity 70 includes:

a receiving unit 71, configured to receive a first message sent by the UE, where the first message includes first information used by the core network entity to determine a target network slice, the first message is used to request to activate a session of the UE in the target network slice, and the target network slice includes a second core network entity; and a sending unit 72, configured to send a second message to the second core network entity, where the second message is used to request to activate the session of the UE, so that the second core network entity activates a user plane connection of the UE based on the second message.

Therefore, when receiving the request for requesting to activate the session in the target network slice that is sent by the UE, the core network entity according to this embodiment of the present invention sends, to the second core network entity in the target network slice, the message for requesting to activate the session of the UE, so that the second core network entity can activate the user plane connection of the UE based on the message sent by the core network entity, to enable the UE to enter a connected mode. In this way, it can be avoided that connection modes are difficult to manage because UE is in an idle mode in a network slice and is in a connected mode in another network slice, and network management efficiency can be improved.

In this embodiment of the present invention, optionally, the target network slice further includes a third core entity, and the UE performs data communication with the third core network entity by using the AN.

After the sending unit 72 sends the second message to the second core network entity, the receiving unit 71 is further configured to receive user plane information sent by the second core network entity, where the user plane information is used by the AN to establish a user plane connection to the third core network entity; and the sending unit 72 is further configured to send the user plane information to the AN, so that the AN establishes the user plane connection to the third core network entity based on the user plane information.

In this embodiment of the present invention, optionally, the first information includes an identifier of the target network slice, or the first information includes a type of the target network slice, or the first information includes a type and a tenant identity of the target network slice.

In this embodiment of the present invention, optionally, the first information includes an identifier allocated by the second core network entity to the UE.

In the aspect of sending a second message to the second core network entity, the sending unit 71 is specifically configured to: determine the second core network entity based on the identifier allocated by the second core network entity to the UE; and send the second message to the second core network entity, where the second message includes the identifier allocated by the second core network entity to the UE.

In this embodiment of the present invention, optionally, the first message further includes session information. In the aspect of sending a second message to the second core network entity, where the second message is used to request to activate the session of the UE, so that the second core network entity activates a user plane connection of the UE based on the second message, the sending unit 71 is specifically configured to send the second message to the second core network entity, where the second message is used to request to activate the session of the UE, and the second message includes the session information, so that the second core network entity activates, based on the second message, the user plane connection for the session indicated by the session information.

In this embodiment of the present invention, optionally, the sending unit 71 is further configured to: send a third message to the UE, where the third message includes the identifier of the target network slice; or send a third message to the UE, where the third message includes information used to indicate a session in an active state in the target network slice.

It should be understood that the core network entity 70 according to this embodiment of the present invention may correspondingly execute the wireless communication method 500 according to the embodiment of the present invention, and the foregoing and other operations and/or functions of each module in the core network entity 70 are respectively intended to implement corresponding procedures executed by the first core network entity in the method 500. For brevity, details are not described herein.

Figure 26:
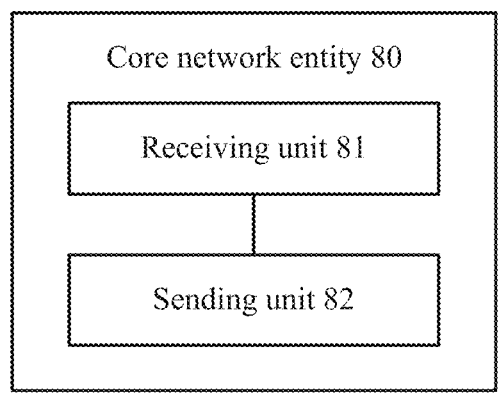
FIG. 26 is a schematic block diagram of a core network entity according to still another embodiment of the present invention.

With reference to FIG. 26, a core network entity according to an embodiment of the present invention is described in detail in the following. The core network entity is applied to a communications system, and the communications system includes user equipment UE, an access network AN, the core network entity, and at least one network slice. As shown in FIG. 26, the core network entity 80 includes:

a receiving unit 81, configured to receive a notification message sent by a second core network entity in a target network slice, where the notification message is used to indicate that the second core network entity has downlink data to be sent to the UE, or the notification message is used to indicate that the second core network entity needs to perform non-access stratum NAS communication with the UE; and a sending unit 82, configured to send a second message to the second core network entity, where the second message is used to request to activate a session of the UE, so that the second core network entity activates a user plane connection of the UE based on the second message.

Therefore, when receiving the notification message sent by the second core network entity, the core network entity according to this embodiment of the present invention sends, to the second core network entity in the target network slice, the message for requesting to activate the session of the UE, so that the second core network entity can activate the user plane connection of the UE based on the message sent by the core network entity, to enable the UE to enter a connected mode. In this way, it can be avoided that connection modes are difficult to manage because UE is in an idle mode in a network slice and is in a connected mode in another network slice, and network management efficiency can be improved.

In this embodiment of the present invention, optionally, the target network slice further includes a third core network entity, and the UE performs data communication with the third core network entity by using the AN.

After the sending unit 82 sends the second message to the second core network entity, the receiving unit 81 is further configured to receive user plane information sent by the second core network entity, where the user plane information is used by the AN to establish a user plane connection to the third core network entity; and the sending unit 82 is further configured to send the user plane information to the AN, so that the AN establishes the user plane connection to the third core network entity based on the user plane information.

In this embodiment of the present invention, optionally, in the aspect of sending a second message to the second core network entity, the sending unit 82 is specifically configured to send the second message to the second core network entity when it is determined that the core network entity is in signaling connection to the UE or has an active session corresponding to the UE.

In this embodiment of the present invention, optionally, before sending the second message to the second core network entity, the sending unit 82 is further configured to send a paging message to the UE when it is determined that the core network entity is not in signaling connection to the UE or has no active session corresponding to the UE, where the paging message includes second information used by the UE to determine the target network slice; and the receiving unit 81 is further configured to receive a first message sent by the UE based on the paging message, where the first message includes first information used by the core network entity to determine the target network slice.

In this embodiment of the present invention, optionally, the second information includes an identifier of the target network slice, or the second information includes a type of the target network slice, or the second information includes a type and a tenant identity of the target network slice, or the second information includes an identifier allocated by the second core network entity to the UE.

In this embodiment of the present invention, optionally, the first information includes an identifier of the target network slice.

In this embodiment of the present invention, optionally, the first information includes an identifier of the second core network entity, and the identifier of the second core network entity includes an identifier of the target network slice.

In this embodiment of the present invention, optionally, the first information includes information about the second core network entity, and the core network entity further includes a determining unit, configured to determine an identifier of the target network slice based on the information about the second core network entity and a preset correspondence, where the preset correspondence includes a correspondence between the information about the second core network entity and an identifier of a network slice.

In this embodiment of the present invention, optionally, the sending unit 82 is further configured to: send a third message to the UE, where the third message includes the identifier of the target network slice; or send a third message to the UE, where the third message includes information used to indicate a session in an active state in the target network slice.

It should be understood that the core network entity 80 according to this embodiment of the present invention may correspondingly execute the wireless communication method 700 according to the embodiment of the present invention, and the foregoing and other operations and/or functions of each module in the core network entity 80 are respectively intended to implement corresponding procedures executed by the first core network entity in the method 700. For brevity, details are not described herein.

Figure 27:
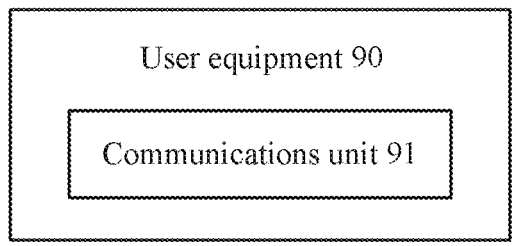
FIG. 27 is a schematic block diagram of user equipment according to still another embodiment of the present invention.

With reference to FIG. 27, a core network entity according to an embodiment of the present invention is described in detail in the following. The core network entity is applied to a communications system, and the communications system includes user equipment UE, an access network AN, the core network entity, and at least one network slice. As shown in FIG. 27, the user equipment 90 includes:

a communications unit 91, configured to send a first message to the first core network entity, where the first message includes first information used by the first core network entity to determine a target network slice, and the target network slice includes a second core network entity, so that the first core network entity sends, to the second core network entity based on the first message, a second message used to request to activate a session of the UE in the target network slice, and the second core network entity activates a user plane connection of the UE based on the second message; where the communications unit 91 is further configured to receive or send data by using the activated user plane connection.

Therefore, the UE according to this embodiment of the present invention sends the request for requesting to activate the session in the target network slice to the first core network entity, so that when receiving the request from the UE, the first core network entity sends, to the second core network entity in the target network slice, the message for requesting to activate the session of the UE, so that the second core network entity can activate the user plane connection of the UE based on the message sent by the first core network entity, to enable the UE to enter a connected mode. In this way, it can be avoided that connection modes are difficult to manage because UE is in an idle mode in a network slice and is in a connected mode in another network slice, and network management efficiency can be improved.

In this embodiment of the present invention, optionally, before the communications unit 91 sends the first message to the first core network entity, the communications unit 91 is further configured to receive a paging message sent by the first core network entity, where the paging message includes second information used by the UE to determine the target network slice.

In this embodiment of the present invention, optionally, before the communications unit 91 sends the first message to the first core network entity, the communications unit 91 is further configured to determine the second information based on the second message and a correspondence between information used by the UE to determine a network slice and information used by the first core network entity to determine the network slice.

In this embodiment of the present invention, optionally, the first information includes an identifier of the target network slice, or the first information includes a type of the target network slice, or the first information includes a type and a tenant identity of the target network slice.

In this embodiment of the present invention, optionally, the second information includes an identifier of the target network slice, or the second information includes a type of the target network slice, or the second information includes a type and a tenant identity of the target network slice, or the second information includes an identifier allocated by the second core network entity to the UE.

In this embodiment of the present invention, optionally, the first information includes an identifier of the target network slice; or the first information includes an identifier of the second core network entity, and the identifier of the second core network entity includes an identifier of the target network slice; or the first information includes information about the second core network entity, and there is a correspondence between an identifier of the second core network entity and an identifier of a network slice.

In this embodiment of the present invention, optionally, the communications unit 91 is further configured to: receive a third message sent by the first core network entity, where the third message includes the identifier of the target network slice, and determine the activated session based on the identifier of the target network slice; or receive a third message sent by the first core network entity, where the third message includes information used to indicate a session in an active state in the target network slice, and determine the activated session based on the information used to indicate the session in the active state in the target network slice.

In this embodiment of the present invention, optionally, the communications unit 91 is further configured to receive a fourth message sent by the AN, where the fourth message includes an identifier of a user plane connection between the UE and the AN and an identifier used to indicate a first session in the activated session, so that the UE stores a first correspondence between the identifier of the user plane connection between the UE and the AN plus the identifier used to indicate the first session, and an identifier of the first session.

In this embodiment of the present invention, optionally, the communications unit 91 is further configured to receive a fifth message sent by the AN, where the fifth message includes an identifier of a user plane connection between the UE and the AN, an identifier used to indicate a first session in the activated session, and information used to indicate the target network slice, so that the UE stores a second correspondence between the identifier used to indicate the first session plus the information used to indicate the target network slice, and an identifier of the first session plus the identifier of the target network slice.

In this embodiment of the present invention, optionally, the communications unit 91 is further configured to: determine to use the first session to send data to the AN; and send a protocol data unit PDU including the data packet to the AN by using the user plane connection corresponding to the identifier of the user plane connection between the UE and the AN based on the identifier of the first session and the first correspondence, where the PDU includes the identifier used to indicate the first session.

In this embodiment of the present invention, optionally, the communications unit 91 is further configured to: determine to use the first session in the target network slice to send data to the AN; and send a protocol data unit PDU including the data packet to the AN by using the user plane connection corresponding to the identifier of the user plane connection between the UE and the AN based on the identifier of the first session, the identifier of the target network slice, and the second correspondence, where the PDU includes the identifier used to indicate the first session and the information used to indicate the target network slice.

It should be understood that the user equipment 90 according to this embodiment of the present invention may correspondingly execute the wireless communication method 900 in the embodiment of the present invention, and the foregoing and other operations and/or functions of each module in the user equipment 90 are respectively used to implement corresponding procedures executed by the user equipment in the method 900. For brevity, details are not described herein again.

Figure 28:
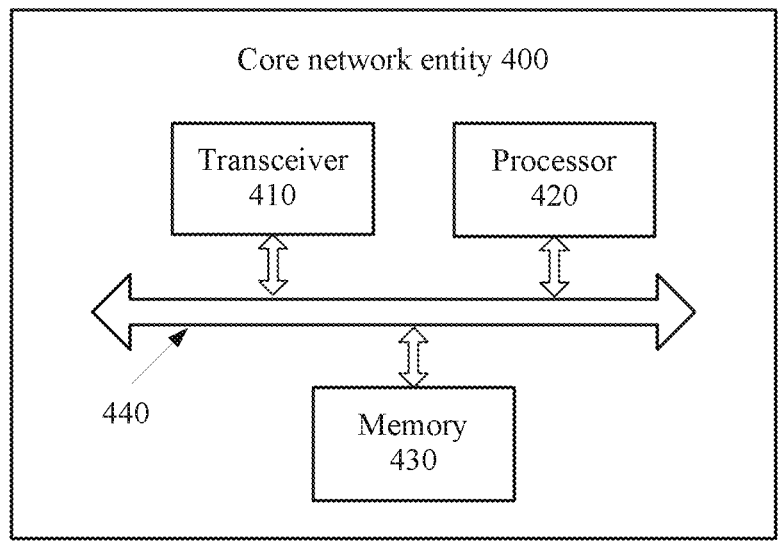
FIG. 28 is a schematic block diagram of a core network entity according to still another embodiment of the present invention.

FIG. 28 is a schematic structural diagram of a core network entity according to another embodiment of the present invention. The core network entity in FIG. 28 can execute a method executed by the first core network entity in the procedures in FIG. 20. The core network entity 400 in FIG. 28 includes a transceiver 410, a processor 420, and a memory 430. The processor 420 controls an operation of the core network entity 400, and may be configured to process a signal. The memory 430 may include a read-only memory and a random access memory, and provide an instruction and data to the processor 420. All components in the core network entity 400 are coupled together by using a bus system 440. In addition to a data bus, the bus system 440 further includes a power bus, a control bus, and a status signal bus. However, for clear description, various types of buses in the figure are marked as the bus system 440.

The method disclosed in the foregoing embodiments of the present invention may be applied to the processor 420, or be implemented by the processor 420. In an implementation process, the steps of the foregoing method may be completed by using a hardware integrated logic circuit in the processor 420 or an instruction in a form of software. The processor 420 may be a general purpose processor, a digital signal processor, an application-specific integrated circuit, a field programmable gate array or another programmable logic device, a discrete gate or a transistor logic device, or a discrete hardware component, and may implement or execute each method, step and logic block diagram disclosed in the embodiments of the present invention. The general purpose processor may be a microprocessor, any conventional processor, or the like. The steps of the method disclosed with reference to the embodiments of the present invention may be directly performed and completed by a hardware processor, or performed and completed by a combination of hardware and software modules in the processor. The software module may be located in a mature storage medium in the field, such as a random memory, a flash memory, a read-only memory, a programmable read-only memory, an electrically-erasable programmable memory, or a register. The storage medium is located in the memory 430, and the processor 420 reads information in the memory 430 and completes the steps in the foregoing methods in combination with hardware of the processor.

Specifically, the transceiver 410 is configured to receive a first message sent by the UE, where the first message includes first information used by the core network entity to determine a target network slice, the first message is used to request to activate a session of the UE in the target network slice, and the target network slice includes a second core network entity; and the transceiver 410 is further configured to send a second message to the second core network entity, where the second message is used to request to activate the session of the UE, so that the second core network entity activates a user plane connection of the UE based on the second message.

Therefore, when receiving the request for requesting to activate the session in the target network slice that is sent by the UE, the core network entity according to this embodiment of the present invention sends, to the second core network entity in the target network slice, the message for requesting to activate the session of the UE, so that the second core network entity can activate the user plane connection of the UE based on the message sent by the core network entity, to enable the UE to enter a connected mode. In this way, it can be avoided that connection modes are difficult to manage because UE is in an idle mode in a network slice and is in a connected mode in another network slice, and network management efficiency can be improved.

Optionally, in an embodiment, the target network slice further includes a third core entity, and the UE performs data communication with the third core network entity by using the AN.

After the transceiver 410 sends the second message to the second core network entity, the transceiver 410 is further configured to receive user plane information sent by the second core network entity, where the user plane information is used by the AN to establish a user plane connection to the third core network entity; and the transceiver 410 is further configured to send the user plane information to the AN, so that the AN establishes the user plane connection to the third core network entity based on the user plane information.

Optionally, in an embodiment, the first information includes an identifier of the target network slice, or the first information includes a type of the target network slice, or the first information includes a type and a tenant identity of the target network slice.

Optionally, in an embodiment, the first information includes an identifier allocated by the second core network entity to the UE.

In the aspect of sending a second message to the second core network entity, the transceiver 410 is specifically configured to: determine the second core network entity based on the identifier allocated by the second core network entity to the UE; and send the second message to the second core network entity, where the second message includes the identifier allocated by the second core network entity to the UE.

Optionally, in an embodiment, the first message further includes session information. In the aspect of sending a second message to the second core network entity, where the second message is used to request to activate the session of the UE, so that the second core network entity activates a user plane connection of the UE based on the second message, the transceiver 410 is specifically configured to send the second message to the second core network entity, where the second message is used to request to activate the session of the UE, and the second message includes the session information, so that the second core network entity activates, based on the second message, the user plane connection for the session indicated by the session information.

Optionally, in an embodiment, the transceiver 410 is further configured to: send a third message to the UE, where the third message includes the identifier of the target network slice; or send a third message to the UE, where the third message includes information used to indicate a session in an active state in the target network slice.

It should be understood that the core network entity 400 according to this embodiment of the present invention may be corresponding to the core network entity 70 according to the embodiment of the present invention, and may be corresponding to a corresponding entity for executing the wireless communication method according to the embodiment of the present invention, and the foregoing and other operations and/or functions of each module in the core network entity 400 are respectively intended to implement corresponding procedures in the method 500. For brevity, details are not described herein.

Alternatively, the transceiver 410 is configured to receive a notification message sent by a second core network entity in a target network slice, where the notification message is used to indicate that the second core network entity has downlink data to be sent to the UE, or the notification message is used to indicate that the second core network entity needs to perform non-access stratum NAS communication with the UE; and the transceiver 410 is further configured to send a second message to the second core network entity, where the second message is used to request to activate a session of the UE, so that the second core network entity activates a user plane connection of the UE based on the second message.

Therefore, when receiving the notification message sent by the second core network entity, the core network entity according to this embodiment of the present invention sends, to the second core network entity in the target network slice, the message for requesting to activate the session of the UE, so that the second core network entity can activate the user plane connection of the UE based on the message sent by the core network entity, to enable the UE to enter a connected mode. In this way, it can be avoided that connection modes are difficult to manage because UE is in an idle mode in a network slice and is in a connected mode in another network slice, and network management efficiency can be improved.

Optionally, in an embodiment, the target network slice further includes a third core network entity, and the UE performs data communication with the third core network entity by using the AN.

After the transceiver 510 sends the second message to the second core network entity, the transceiver 510 is further configured to receive user plane information sent by the second core network entity, where the user plane information is used by the AN to establish a user plane connection to the third core network entity; and the transceiver 510 is further configured to send the user plane information to the AN, so that the AN establishes the user plane connection to the third core network entity based on the user plane information.

Optionally, in an embodiment, in the aspect of sending a second message to the second core network entity, the transceiver 510 is specifically configured to send the second message to the second core network entity when it is determined that the core network entity is in signaling connection to the UE or has an active session corresponding to the UE.

Optionally, in an embodiment, before sending the second message to the second core network entity, the transceiver 510 is further configured to send a paging message to the UE when it is determined that the core network entity is not in signaling connection to the UE or has no active session corresponding to the UE, where the paging message includes second information used by the UE to determine the target network slice; and the transceiver 510 is further configured to receive a first message sent by the UE based on the paging message, where the first message includes first information used by the core network entity to determine the target network slice.

Optionally, in an embodiment, the second information includes an identifier of the target network slice, or the second information includes a type of the target network slice, or the second information includes a type and a tenant identity of the target network slice, or the second information includes an identifier allocated by the second core network entity to the UE.

Optionally, in an embodiment, the first information includes an identifier of the target network slice.

Optionally, in an embodiment, the first information includes an identifier of the second core network entity, and the identifier of the second core network entity includes an identifier of the target network slice.

Optionally, in an embodiment, the first information includes information about the second core network entity. The processor 520 is configured to determine an identifier of the target network slice based on the information about the second core network entity and a preset correspondence, where the preset correspondence includes a correspondence between the information about the second core network entity and an identifier of a network slice.

Optionally, in an embodiment, the transceiver 510 is further configured to: send a third message to the UE, where the third message includes the identifier of the target network slice; or send a third message to the UE, where the third message includes information used to indicate a session in an active state in the target network slice.

It should be understood that the core network entity 400 according to this embodiment of the present invention may be corresponding to the core network entity 80 according to the embodiment of the present invention, and may be corresponding to a corresponding entity for executing the wireless communication method according to the embodiment of the present invention, and the foregoing and other operations and/or functions of each module in the core network entity 400 are respectively intended to implement corresponding procedures in the method 700. For brevity, details are not described herein.

Figure 29:
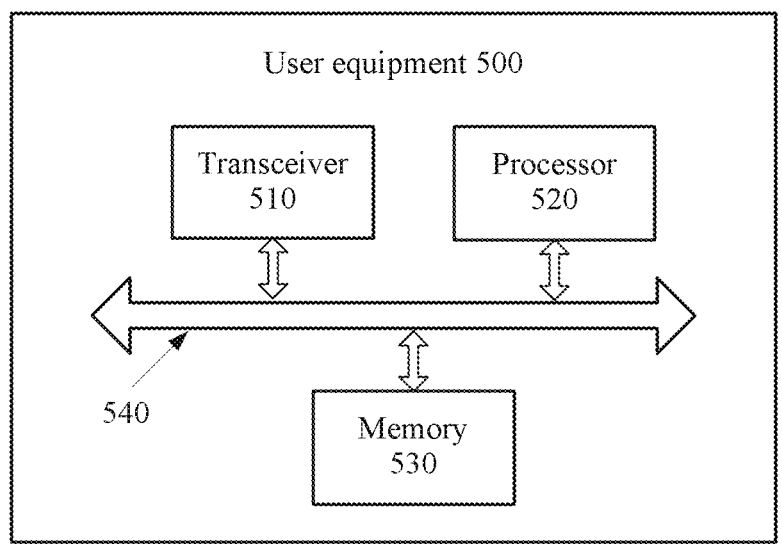
FIG. 29 is a schematic block diagram of user equipment according to still another embodiment of the present invention.

FIG. 29 is a schematic structural diagram of user equipment according to another embodiment of the present invention. The user equipment in FIG. 29 may be configured to execute a method executed by the user equipment in the procedures in FIG. 24. The user equipment 500 in FIG. 29 includes a transceiver 510, a processor 520, and a memory 530. The processor 520 controls an operation of the user equipment 500, and may be configured to process a signal. The memory 530 may include a read-only memory and a random access memory, and provide an instruction and data to the processor 520. All components of the user equipment 500 are coupled together by using a bus system 540. In addition to a data bus, the bus system 540 further includes a power bus, a control bus, and a status signal bus. However, for clear description, various types of buses in the figure are marked as the bus system 540.

The method disclosed in the foregoing embodiments of the present invention may be applied to the processor 520, or be implemented by the processor 520. In an implementation process, the steps of the foregoing method may be completed by using a hardware integrated logic circuit in the processor 520 or an instruction in a form of software. The processor 520 may be a general purpose processor, a digital signal processor, an application-specific integrated circuit, a field programmable gate array or another programmable logic device, a discrete gate or a transistor logic device, or a discrete hardware component, and may implement or execute each method, step and logic block diagram disclosed in the embodiments of the present invention. The general purpose processor may be a microprocessor, any conventional processor, or the like. The steps of the method disclosed with reference to the embodiments of the present invention may be directly performed and completed by a hardware processor, or performed and completed by a combination of hardware and software modules in the processor. The software module may be located in a mature storage medium in the field, such as a random memory, a flash memory, a read-only memory, a programmable read-only memory, an electrically-erasable programmable memory, or a register. The storage medium is located in the memory 530, and the processor 520 reads information in the memory 530 and completes the steps in the foregoing methods in combination with hardware of the processor.

Specifically, the transceiver 510 is configured to send a first message to the first core network entity, where the first message includes first information used by the first core network entity to determine a target network slice, and the target network slice includes a second core network entity, so that the first core network entity sends, to the second core network entity based on the first message, a second message used to request to activate a session of the UE in the target network slice, and the second core network entity activates a user plane connection of the UE based on the second message. The transceiver 510 is further configured to receive or send data by using the activated user plane connection.

Therefore, the UE according to this embodiment of the present invention sends the request for requesting to activate the session in the target network slice to the first core network entity, so that when receiving the request from the UE, the first core network entity sends, to the second core network entity in the target network slice, the message for requesting to activate the session of the UE, so that the second core network entity can activate the user plane connection of the UE based on the message sent by the first core network entity, to enable the UE to enter a connected mode. In this way, it can be avoided that connection modes are difficult to manage because UE is in an idle mode in a network slice and is in a connected mode in another network slice, and network management efficiency can be improved.

Optionally, in an embodiment, before the transceiver 510 sends the first message to the first core network entity, the transceiver 510 is further configured to receive a paging message sent by the first core network entity, where the paging message includes second information used by the UE to determine the target network slice.

Optionally, in an embodiment, before the transceiver 510 sends the first message to the first core network entity, the transceiver 510 is further configured to determine the second information based on the second message and a correspondence between information used by the UE to determine a network slice and information used by the first core network entity to determine the network slice.

Optionally, in an embodiment, the first information includes an identifier of the target network slice, or the first information includes a type of the target network slice, or the first information includes a type and a tenant identity of the target network slice.

Optionally, in an embodiment, the second information includes an identifier of the target network slice, or the second information includes a type of the target network slice, or the second information includes a type and a tenant identity of the target network slice, or the second information includes an identifier allocated by the second core network entity to the UE.

Optionally, in an embodiment, the first information includes an identifier of the target network slice; or the first information includes an identifier of the second core network entity, and the identifier of the second core network entity includes an identifier of the target network slice; or the first information includes information about the second core network entity, and there is a correspondence between an identifier of the second core network entity and an identifier of a network slice.

Optionally, in an embodiment, the transceiver 510 is further configured to: receive a third message sent by the first core network entity, where the third message includes the identifier of the target network slice, and determine the activated session based on the identifier of the target network slice; or receive a third message sent by the first core network entity, where the third message includes information used to indicate a session in an active state in the target network slice, and determine the activated session based on the information used to indicate the session in the active state in the target network slice.

Optionally, in an embodiment, the transceiver 510 is further configured to receive a fourth message sent by the AN, where the fourth message includes an identifier of a user plane connection between the UE and the AN and an identifier used to indicate a first session in the activated session, so that the UE stores a first correspondence between the identifier of the user plane connection between the UE and the AN plus the identifier used to indicate the first session, and an identifier of the first session.

Optionally, in an embodiment, the transceiver 510 is further configured to receive a fifth message sent by the AN, where the fifth message includes an identifier of a user plane connection between the UE and the AN, an identifier used to indicate a first session in the activated session, and information used to indicate the target network slice, so that the UE stores a second correspondence between the identifier used to indicate the first session plus the information used to indicate the target network slice, and an identifier of the first session plus the identifier of the target network slice.

Optionally, in an embodiment, the transceiver 510 is further configured to: determine to use the first session to send data to the AN; and send a protocol data unit PDU including the data packet to the AN by using the user plane connection corresponding to the identifier of the user plane connection between the UE and the AN based on the identifier of the first session and the first correspondence, where the PDU includes the identifier used to indicate the first session.

Optionally, in an embodiment, the transceiver 510 is further configured to: determine to use the first session in the target network slice to send data to the AN; and send a protocol data unit PDU including the data packet to the AN by using the user plane connection corresponding to the identifier of the user plane connection between the UE and the AN based on the identifier of the first session, the identifier of the target network slice, and the second correspondence, where the PDU includes the identifier used to indicate the first session and the information used to indicate the target network slice.

It should be understood that the user equipment 500 according to this embodiment of the present invention may be corresponding to the user equipment 90 according to the embodiment of the present invention, and may be corresponding to a corresponding entity for executing the wireless communication method according to the embodiment of the present invention, and the foregoing and other operations and/or functions of each module in the user equipment 500 are respectively intended to implement corresponding procedures in the method 900. For brevity, details are not described herein.

It should be noted that the foregoing method embodiments of the present invention may be applied to the processor, or be implemented by the processor. The processor may be an integrated circuit chip and has a signal processing capability. In an implementation process, steps in the foregoing method embodiments can be implemented by using a hardware integrated logical circuit in the processor, or by using instructions in a form of software. The processor may further be a general processor, a digital signal processor (Digital Signal Processing, DSP), an application-specific integrated circuit (Application-Specific Integrated Circuit, ASIC), a field programmable gate array (Field Programmable Gate Array, FPGA), another programmable logic device, a discrete gate, a transistor logic device, or a discrete hardware component. All methods, steps, and logical block diagrams disclosed in this embodiment of the present invention may be implemented or performed. The general purpose processor may be a microprocessor or the processor may be any normal processor, or the like. Steps of the methods disclosed in the embodiments of the present invention may be directly performed and completed by a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It may be understood that, the memory in the embodiments of the present invention may be a volatile memory or a nonvolatile memory, or may include a volatile memory and a nonvolatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. For example but not for limitation, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the system and method described in this specification aims to include but is not limited to these memories and any memory of another proper type.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of the present invention essentially, or the part contributing to the prior art, or part of the technical solutions may be implemented in the form of a software product. The computer software product is stored in a storage medium, and includes several instructions for instructing a computer device (which may be a personal computer, a server, or a network device) to execute all or part of the steps of the method described in the embodiment of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:
1. User equipment (UE), comprising:
a transceiver;

a memory storing one or more instructions; and a processor coupled to the transceiver and the memory and configured to execute the one or more instructions to cause the UE to:

establish a signaling connection to a first core network entity of a communications system that comprises the first core network entity, a radio access network (RAN), the UE, and at least one network slice; and send, using the transceiver, network slice information and a first non-access stratum (NAS) container to the first core network entity, wherein the first NAS container includes a first NAS message and the network slice information enables the first core network entity to determine a target network slice from the at least one network slice based on the network slice information, and wherein the UE performs NAS communication with a second core network entity in the target network slice using the RAN and the first core network entity.

2. The UE according to claim 1, wherein the network slice information is a network slice identifier or a data transmission requirement for a network slice.

3. The UE according to claim 1, wherein the processor is further configured to execute the one or more instructions to cause the UE to:

send, using the transceiver, a first message to the first core network entity, wherein the first message comprises first information to be used by the first core network entity to determine a target network slice that comprises the second core network entity; and send or receive, using the transceiver, data using an activated user plane connection.

4. The UE according to claim 3, wherein the processor is further configured to execute the one or more instructions to cause the UE to, before sending the first message to the first core network entity, receive, using the transceiver, a paging message from the first core network entity, and wherein the paging message comprises second information to be used by the UE to determine the target network slice.

5. The UE according to claim 4, wherein the processor is further configured to execute the one or more instructions to cause the UE to, before sending the first message to the first core network entity, determine the first information based on the second information and a correspondence between information used by the UE to determine a network slice and information used by the first core network entity to determine the network slice.

6. The UE according to claim 1, wherein the processor is further configured to execute the one or more instructions to cause the UE to receive a second NAS container from the first core network entity, wherein the second NAS container is from the second core network entity and includes a second NAS message, and wherein content in the second NAS container is not parsed by the first core network entity.

7. The UE according to claim 1, wherein content in the first NAS container is not parsed by the first core network entity.

8. The UE according to claim 1, wherein the first NAS container is configured to be forwarded by the first core network entity to the second core network entity.

9. A wireless communication method implemented by user equipment (UE), wherein the wireless communication method comprises:

establishing a signaling connection to a first core network entity of a communications system that comprises the first core network entity, a radio access network (RAN), the UE, and at least one network slice; and sending network slice information and a first non-access stratum (NAS) container to the first core network entity, wherein the first NAS container includes a first NAS message and the network slice information enables the first core network entity to determine a target network slice from the at least one network slice based on the network slice information, and wherein the UE performs NAS communication with a second core network entity in the target network slice using the RAN and the first core network entity.

10. The wireless communication method of claim 9, wherein the network slice information is a network slice identifier or a data transmission requirement for a network slice.

11. The wireless communication method of claim 9, further comprising:

sending a first message to the first core network entity, wherein the first message comprises first information to be used by the first core network entity to determine a target network slice that comprises the second core network entity; and sending or receiving data using an activated user plane connection.

12. The wireless communication method of claim 11, further comprising, before sending the first message to the first core network entity, receiving a paging message from the first core network entity, wherein the paging message comprises second information to be used by the UE to determine the target network slice.

13. The wireless communication method of claim 12, further comprising, before sending the first message to the first core network entity, determining the first information based on the second information and a correspondence between information used by the UE to determine a network slice and information used by the first core network entity to determine the network slice.

14. The wireless communication method of claim 9, further comprising receiving a second NAS container from the first core network entity, wherein the second NAS container is from the second core network entity and includes a second NAS message, and wherein content in the second NAS container is not parsed by the first core network entity.

15. The wireless communication method of claim 9, wherein content in the first NAS container is not parsed by the first core network entity.

16. The wireless communication method of claim 9, wherein the first NAS container is configured to be forwarded by the first core network entity to the second core network entity.

17. A non-transitory computer readable medium comprising computer-executable instructions, wherein the computer-executable instructions, when executed by a processor, cause a user equipment (UE) to:

establish a signaling connection to a first core network entity of a communications system that comprises the first core network entity, a radio access network (RAN), the UE, and at least one network slice; and send network slice information and a first non-access stratum (NAS) container to the first core network entity, wherein the first NAS container includes a first NAS message and the network slice information enables the first core network entity to determine a target network slice from the at least one network slice based on the network slice information, and wherein the UE performs NAS communication with a second core network entity in the target network slice using the RAN and the first core network entity.

18. The non-transitory computer readable medium of claim 17, wherein the network slice information is a network slice identifier or a data transmission requirement for a network slice.

19. The non-transitory computer readable medium of claim 17, wherein when executed by the processor, the computer-executable instructions are further configured to cause the UE to:
  send a first message to the first core network entity, wherein the first message comprises first information to be used by the first core network entity to determine a target network slice that comprises the second core network entity; and
  send or receive data using an activated user plane connection.

20. The non-transitory computer readable medium of claim 19, wherein when executed by the processor, the computer-executable instructions are further configured to cause the UE to, before sending the first message to the first core network entity, receive, using the transceiver, a paging message from the first core network entity, and wherein the paging message comprises second information to be used by the UE to determine the target network slice.

21. The non-transitory computer readable medium of claim 20, wherein when executed by the processor, the computer-executable instructions are further configured to cause the UE to, before sending the first message to the first core network entity, determine the first information based on the second information and a correspondence between information used by the UE to determine a network slice and information used by the first core network entity to determine the network slice.

22. The non-transitory computer readable medium of claim 17, wherein when executed by the processor, the computer-executable instructions are further configured to cause the UE to receive a second NAS container from the first core network entity, wherein the second NAS container is from the second core network entity and includes a second NAS message, and wherein content in the second NAS container is not parsed by the first core network entity.

23. The non-transitory computer readable medium of claim 17, wherein content in the first NAS container is not parsed by the first core network entity.

24. The non-transitory computer readable medium of claim 17, wherein the first NAS container is configured to be forwarded by the first core network entity to the second core network entity.

* * * * *